US009462428B2

(12) United States Patent  
Yu et al.

(10) Patent No.: US 9,462,428 B2  
(45) Date of Patent: Oct. 4, 2016

(54) MOBILE TERMINAL, COMMUNICATION SYSTEM AND METHOD OF MANAGING MISSING MODE USING SAME

(75) Inventors: Jihye Yu, Seoul (KR); Sangyeon Lim, Seoul (KR); Sungtae Cho, Seoul (KR); Seungkwon Ahn, Seoul (KR); Seungsook Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 12/610,015

(22) Filed: Oct. 30, 2009

(65) Prior Publication Data

US 2010/0240403 A1    Sep. 23, 2010

(30) Foreign Application Priority Data

Mar. 18, 2009  (KR) .................. 10-2009-0022920

(51) Int. Cl.
*H04W 4/12* (2009.01)
*H04M 1/725* (2006.01)
*H04W 4/22* (2009.01)
*H04W 76/00* (2009.01)

(52) U.S. Cl.
CPC .......... *H04W 4/12* (2013.01); *H04M 1/72572* (2013.01); *H04W 4/22* (2013.01); *H04W 76/007* (2013.01)

(58) Field of Classification Search
CPC ....... H04W 4/12; H04W 4/22; H04W 12/02; H04W 12/06; H04W 4/02; H04W 4/021; H04W 4/025; H04W 8/20; H04W 88/02; H04W 12/00; H04W 28/18; H04W 4/18; H04L 63/14; H04L 41/22

USPC .................. 455/419, 466, 410, 414.2, 412.2
See application file for complete search history.

(56) References Cited

U.S. PATENT DOCUMENTS

| | | | |
|---|---|---|---|
| 6,662,023 B1* | 12/2003 | Helle | 455/411 |
| 7,546,639 B2* | 6/2009 | Bantz et al. | 726/27 |
| 2003/0161459 A1* | 8/2003 | McBlain | H04Q 3/0029 379/220.01 |
| 2006/0276175 A1* | 12/2006 | Chandran | 455/558 |
| 2007/0082705 A1* | 4/2007 | Jain et al. | 455/558 |
| 2009/0144193 A1* | 6/2009 | Giordano | G06Q 20/04 705/39 |

FOREIGN PATENT DOCUMENTS

| | | |
|---|---|---|
| JP | 2003-224886 A | 8/2003 |
| JP | 2007-306056 A | 11/2007 |
| KR | 10-2006-0080738 A | 7/2006 |

* cited by examiner

*Primary Examiner* — George Eng  
*Assistant Examiner* — Jing Gao  
(74) *Attorney, Agent, or Firm* — Birch, Stewart, Kolasch & Birch, LLP

(57) ABSTRACT

The present invention is related to a mobile terminal, a communication system, and a method for managing a missing mode using the same. The present invention describes a mobile terminal comprising a communication unit, memory configured to store information relating to being lost including a message notifying of being lost and a controller, if a first communication function is carried out through the communication unit with a second terminal as a receiver while a missing mode is activated through the communication unit by a remote control from a first terminal, configured to transfer the information relating to being lost to the second terminal; and a communication system including the mobile terminal and provides a method for managing a missing mode using the same.

18 Claims, 23 Drawing Sheets

MOBILE TERMINAL, COMMUNICATION SYSTEM AND METHOD OF MANAGING MISSING MODE USING SAME

The present application claims priority to Korean Application No. 10-2009-0022920 filed in Korea on Mar. 18, 2009, the entire contents of which are hereby incorporated by reference in their entirety.

BACKGROUND OF THE INVENTION

1. Field of the Invention

The present invention is related to a mobile terminal and a communication system. More specifically, the present invention is related to a mobile terminal, a communication system and a method of managing a missing mode using the same for controlling a missing mobile terminal.

2. Description of the Related Art

Recently, mobile terminals realized in various forms and equipped with various functions are becoming widespread in rapid fashion. At the same time, through either users' carelessness or theft, the number of missing mobile terminals is increasing sharply. However, it is very rare that a lost mobile terminal is returned to its owner.

SUMMARY OF THE INVENTION

Accordingly, one object of the present invention is to provide a mobile terminal, a communication system, and a method for managing a missing mode using the same, by which when a mobile terminal is lost, its owner can easily monitor the use of the lost mobile terminal at a remote place and at the same time, restrict functional operations of the lost mobile terminal, thereby finding the lost mobile terminal in an easy manner.

As a first aspect of the present invention, a mobile terminal according to the present invention includes a communication unit, a memory configured to store information relating to being lost including a message notifying of being lost, and a controller. If a first communication function is carried out through the communication unit with a second terminal as a receiver while a missing mode is activated through the communication unit by a remote control from a first terminal, configured to transfer the information relating to being lost to the second terminal.

As a second aspect of the present invention, a method for managing a missing mode of a mobile terminal according to the present invention includes activating a missing mode of the mobile terminal by remote control of a first terminal and carrying out a first communication function with a second terminal as a receiver, wherein the carrying out a first communication function includes transferring information relating to being lost including a message notifying of being lost to the second terminal.

As a third aspect of the present invention, a mobile terminal according to the present invention includes a communication unit and a controller. When receiving a communication connection request or a message from a first terminal or being connected to the first terminal according to the communication connection request, to the mobile terminal receives information relating to being lost including a message notifying of being lost and a contact point from the first terminal and specifies the received contact point to be a receiver when carrying out a communication function for responding to the first terminal.

As a fourth aspect of the present invention, a method for managing a missing mode of a communication system according to the present invention includes: in the first terminal, activating a missing mode by remote control from an external third terminal; in the first terminal, carrying out a first communication function with a second terminal as a receiver and transferring information relating to being lost including a message notifying of being lost to the second terminal; and in the second terminal, outputting the information relating to being lost, wherein the information relating to being lost is capable of being output in at least one of text, audio, and image in the second terminal and is not output in the first terminal visually and audibly.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The aforementioned object, characteristics, and advantageous effects of the present invention will be made clearer through the detailed description given below with reference to appended drawings. In order that the invention may be fully understood, preferred embodiments thereof will now be described with reference to the accompanying drawings. Throughout the document, the same reference numbers indicate the same components. Also, if disclosure or detailed description of organization of the present invention is found to obscure the purpose and the spirit thereof, the corresponding description will not be given.

In the following, a mobile terminal related to the present invention will now be described in detail with reference to appended drawings. The suffix "module" or "unit" used to indicate a component in the description below has been introduced or used interchangeably only for the purpose of description of the invention and thus does not provide a unique meaning or a function distinguished from each other.

A mobile terminal of the present invention can include a mobile phone, a smart phone, a laptop computer, a digital broadcasting terminal, a personal digital assistant (PDA), a portable multimedia player (PMP), and a navigation terminal.

Figure 1:
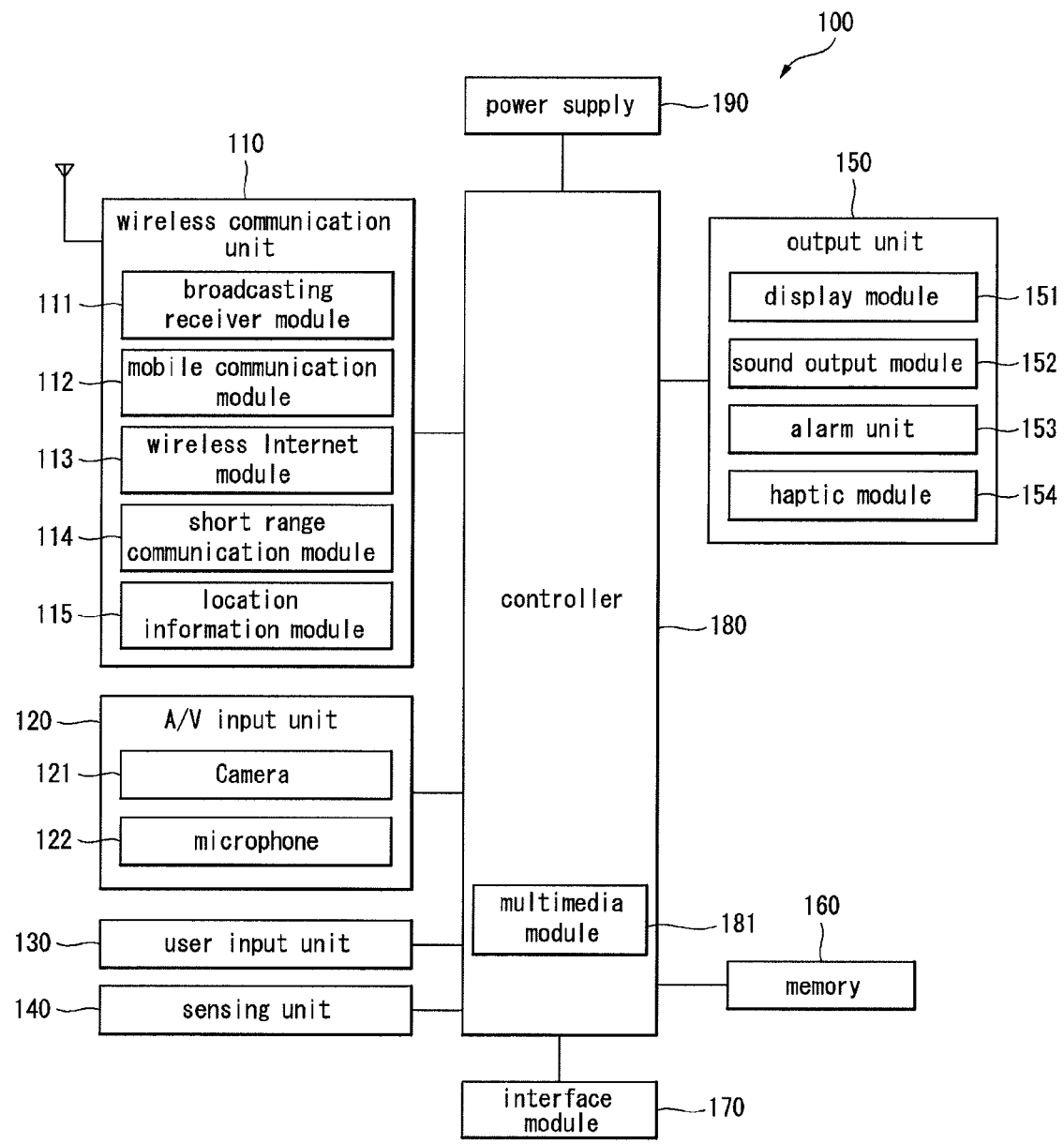
FIG. 1 is a block diagram of a mobile terminal according to one embodiment of the present invention.

FIG. 1 is a block diagram of a mobile terminal according to one embodiment of the present invention.

The mobile terminal 100 includes a wireless communication unit 110, an audio/video (A/V) input unit 120, a user input unit 130, a sensing unit 140, an output unit 150, memory 160, an interface unit 170, a controller 180, and a power supply 190. The components illustrated in FIG. 1 are not necessarily demanded; a mobile terminal can be realized with more or a smaller number of components than suggested.

In what follows, the respective components are described one after another.

A wireless communication unit 110 includes one or more modules that enable wireless communication between a mobile terminal 100 and a wireless communication system or between a mobile terminal 100 and a network in which the mobile terminal 100 is located. For example, the wireless communication unit 110 can include a broadcasting receiving module 111, a mobile communication module 112, a wireless Internet module 113, a short range communication module 114, and a location information module 115.

The broadcasting receiving module 111 receives broadcasting signals and/or broadcasting related information from an external broadcasting management server through a broadcasting channel.

The broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of combination of data broadcasting signals and TV broadcasting signals or radio broadcasting signals.

The broadcasting related information can be information on a broadcasting channel, a broadcasting program or a broadcasting service provider, and can be provided even through a mobile communication network. In the latter case, the broadcasting related information can be received by the mobile communication module 112.

The broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

The broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, The broadcasting receiving module 111 can also be constructed to be suited to other broadcasting systems that provide broadcasting signals as well as the aforementioned digital broadcasting systems Broadcasting signals and/or broadcasting related information received through the broadcasting receiving module 111 can be stored in the memory 160.

The mobile communication module 112 transmits and receives a radio signal to and from at least one of a base station, an external terminal and a server on a mobile communication network. The radio signal can include a voice call signal, a video telephony call signal or data in various forms according to transmission and reception of text/multimedia messages.

The wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

The short range communication module 114 corresponds to a module for short range communication. Bluetooth, radio frequency identification (RFID), infrared data association (IrDA), ultra wideband (UWB) and ZigBee can be used as a short range communication technique.

The location information module 115 can confirm or obtain the location of a mobile terminal. The location information module 115 can obtain location information through a global navigation satellite system (GNSS). GNSS is a generic term for satellite navigation systems that provide reference signals by which particular types of radio navigation receivers can determine their positions on or near the earth's surface. The GNSS comprises the U.S. system GPS (Global Positioning System), the European system Galileo, the Russian system GLONASS (Global Orbiting Navigational Satellite System), the Chinese system COMPASS, and the Japanese system QZSS (Quasi-Zenith Satellite System).

In a typical example of GNSS, the location information module 115 can be a GPS module. The GPS module measures distances between a particular position and more than three satellites, extracts information about the time at which the distances are measured, and applies triangulation to the measured distances, thereby obtaining three dimensional position information expressed by latitude, longitude, and altitude. Another popular GPS triangulation method uses three satellites to obtain position and time information and incorporates signals from a fourth satellite to compensate for error of the position and time information. The GPS module continuously calculates current position in real time and estimates velocity information based on the calculated position.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

The image frames processed by the camera 121 can be stored in the memory 160 or transmitted to an external device through the radio communication unit 110. The mobile terminal 100, depending on system configuration, can comprise more than two cameras 121.

A microphone 122 receives external sound signals through a microphone and transforms the sound signals into electrical voice data in a call mode, recording mode, or voice recognition mode. Processed voice data, in a call mode, can be transformed into the form suitable for transferring to a mobile communication base station and output through a mobile communication module 112. A microphone 122 can use various noise suppression algorithms to remove noise generated while external sound signals are received.

A user input unit 130 generates input data for a user to control operations of a terminal. The user input unit 130. A user input unit 130 can comprise a keypad, dome switches, touch pad (electropressure/electrostatic), jog wheel, jog switches, and the like.

The sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100. For example, the sensing unit 140 can sense whether a slide phone is opened or closed when the mobile terminal 100 is a slide phone. Furthermore, the sensing unit 140 can sense whether the power supply 190 supplies power and whether the interface 170 is connected to an external device. The sensing unit 140 can also include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. These displays can be called a transparent display; a typical example of the transparent display is a transparent LCD. The rear structure of the display unit 151 can also be of the light transmission type. Accordingly, a user can see an object located behind the body of the mobile terminal 100 through the transparent area of the body of the mobile terminal 100, which is occupied by the display unit 151.

According to implementation type of a mobile terminal 100, more than two display units 151 can exist. For example, in a mobile terminal 100, multiple display units can be placed separated in one surface, connected as a whole, or at different surfaces.

If a display unit 151 and a sensor recognizing touch motion (hereinafter, it is called 'touch sensor') makes up a layered structure between each other (hereinafter, it is called 'touch screen'), a display unit 151 can also be used as an input device in addition to an output device. A touch sensor can have the form of a touch film, touch sheet, touch pad, and the like.

A touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

When the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, a proximity sensor of the sensing unit 140 can be located in an internal region of the mobile terminal, surrounded by the touch screen, or near the touch screen. The proximity sensor senses an object approaching a predetermined sensing surface or an object located near the proximity sensor using an electromagnetic force or infrared rays without having mechanical contact. Further, the proximity sensor has a lifetime longer than that of a contact sensor and thus has a wide application in the mobile terminal 100.

Examples of a proximity sensor include a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed in such a way that proximity of a pointer is detected through a variation in an electric field according to the proximity of the pointer. In this case, the touch screen (touch sensor) can be classified as a proximity sensor.

For the convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen at right angles.

The proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

The audio output module 152 can output audio data received from the wireless communication unit 110 or stored in the memory 160 in a call signal receiving mode, a telephone call mode, a recording mode, a speech recognition mode, or a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc. Also, the audio output module 152 can output audio signals through an earphone jack 116. The user can listen to the output audio by connecting an earphone to the earphone jack 116.

The alarm 153 outputs a signal for indicating the generation of an event of the mobile terminal 100. For example, alarms can be generated in the case of reception of a call signal, reception of a message, a key signal input, a touch input, etc. The alarm 153 can also output signals in a form different from video signals or audio signals, for example, by using a signal for indicating generation of an event through vibration. The video signals or the audio signals can be also output through the display unit 151 or the audio output module 152.

The haptic module 154 generates various haptic effects that the user can feel. One representative example of the haptic effects is vibration. The intensity and pattern of vibration generated by the haptic module 154 are controllable. For example, different vibrations can be combined and output or can be sequentially output.

The haptic module 154 can generate a variety of haptic effects including an effect of stimulus according to arrangement of pins vertically moving against a contact skin surface, an effect of stimulus according to a jet force or sucking force of air through a jet hole or an intake hole, an effect of stimulus of rubbing the skin, an effect of stimulus according to contact of an electrode, an effect of stimulus using an electrostatic force, and an effect according to the reproduction of cold and warmth using an element capable of absorbing or radiating heat in addition to vibrations.

The haptic module 154 not only can transmit haptic effects through direct contact but also allows the user to feel haptic effects through a kinesthetic sense of the user's fingers or arms. The mobile terminal 100, depending on system configuration, can comprise more than two haptic modules 154.

The memory 160 can store a program for the operation of the controller 180 and temporarily store input/output data (for example, phone book, messages, still images, moving images, etc.). The memory 160 can also store data about vibrations and sounds in various patterns, which are output when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface unit 170 serves as a path to external devices connected to the mobile terminal 100. The interface unit 170 receives data or power from the external devices and transmits the data or power to the internal components of the mobile terminal 100 or transmits data of the mobile terminal 100 to the external devices. The interface unit 170, for example, can include a wired/wireless headset port, an external charger port, a wired/wireless data port, a memory card port, a port for connecting a device having an identification module, an audio I/O port, a video I/O port, and an earphone port.

The identification module is a chip that stores information for authenticating the authority to use the mobile terminal 100. For example, the identification module can include a user identify module (UIM), a subscriber identify module (SIM) and a universal subscriber identify module (USIM). A device equipped with an identification module can be manufactured in the form of a smart card. Accordingly, the identification device can be connected to the mobile terminal 100 through a port of the interface unit 170.

The interface unit 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

The controller 180 controls the overall operations of a mobile terminal. For example, the controller 180 performs control and processing of voice communication, data communication and video telephony. The controller 180 can also include a multimedia module 181 for playing multimedia. The multimedia module 181 can be implemented in the controller 180 or can be implemented separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments described in the document can be realized in a computer-readable recording medium or in a device similar thereto by using software, hardware, or a combination of both.

As for hardware implementation, embodiments described in the document can be realized by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing functions. For some cases, such embodiments can be realized by the controller 180.

As for software implementation, embodiments such as procedures or functions can be realized by a separate software module that enables at least one function or operation. Software codes can be implemented by a software application written by a relevant program language. Also, software codes can be stored in the memory 160 and can be executed by the controller 180.

Figure 2A:
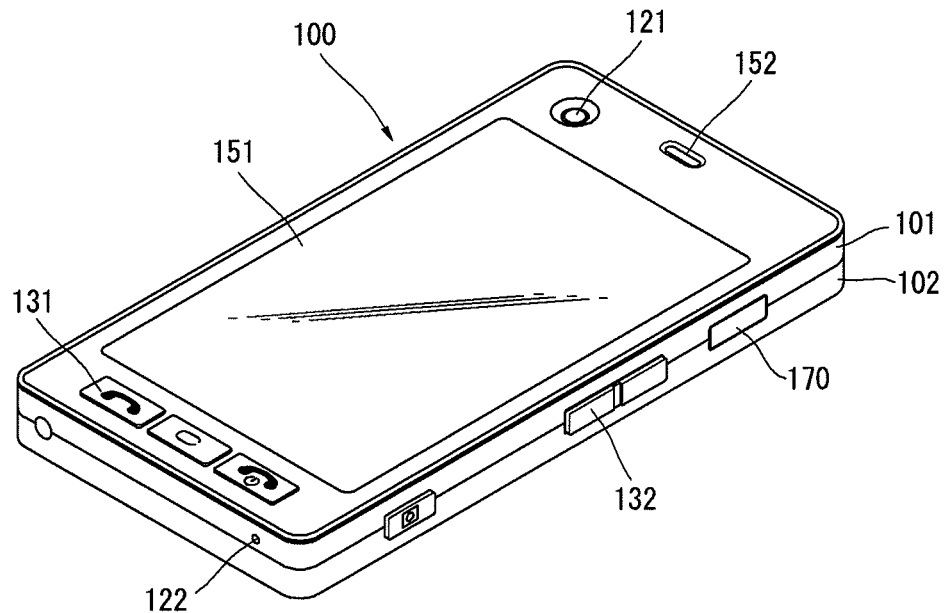
FIG. 2A is a front perspective view of a mobile terminal according to one embodiment of the present invention.

FIG. 2A is a front perspective view of a mobile terminal or a handheld terminal according to one embodiment of the present invention.

In this example, the handheld terminal 100 has a bar type terminal body. However, the present invention is not limited to a bar type terminal and can be applied to terminals of various types including slide type, folder type, swing type and swivel type terminals where more than two bodies move relative to each other.

The terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be arranged between the front case 101 and the rear case 102.

The cases can be made of plastics through injection molding or made of a metal material such as stainless steel (STS) or titanium (Ti).

In the terminal body, usually in the front case 101, a display unit 151, an audio output unit 152, a camera 121, a user input unit 130/131, 132, a microphone 122, and an interface unit 170 can be arranged.

The display unit 151 occupies most of the main face of the front case 101. The audio output unit 152 and the camera 121 are arranged in a region close to one of both ends of the display unit 151. The user input unit 131 and the microphone 122 are located in a region close to the other end of the display unit 151. Another user input unit 132 and the interface unit 170 are arranged on the sides of the front case 101 and the rear case 102.

The user input unit 130, which includes multiple operating units 131, 132, is operated to receive commands for controlling the operation of the handheld terminal 100. The operating units 131, 132 can be referred to as manipulating portions and can employ any tactile manner once the employed manner can enable the user to operate the operating units 131, 132 with a tactile feeling.

A first or second operating unit 131, 132 can receive various inputs. For example, a first operating unit 131 receives commands such as start, end, and scroll and a second operating unit 132 receives commands such as control of the volume of the sound output from the audio output unit 152 or conversion of the display unit 151 into a touch recognition mode.

Figure 2B:
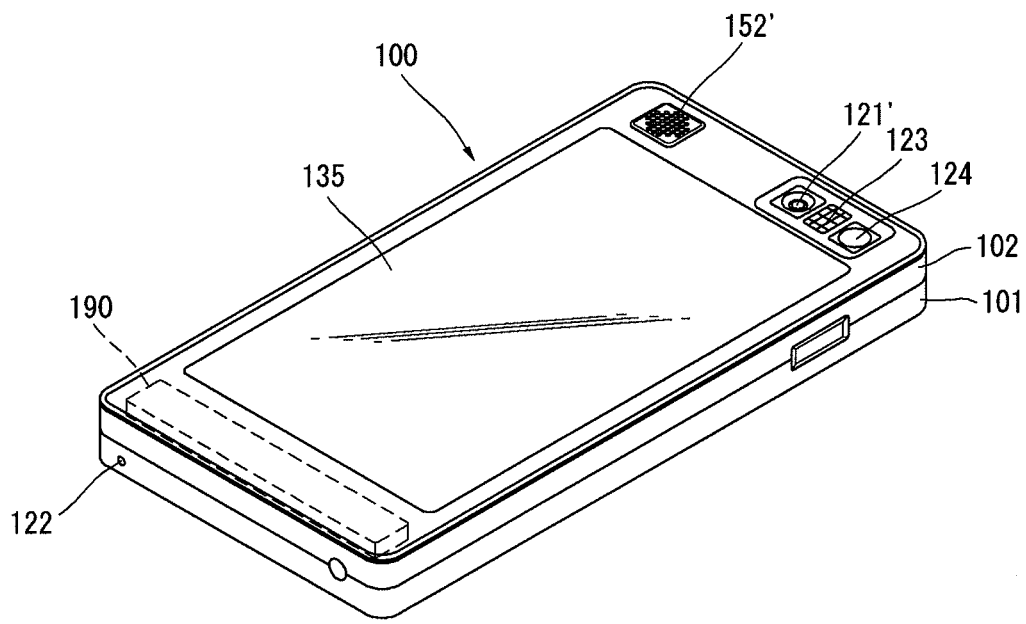
FIG. 2B is a rear perspective view of a handheld terminal according to one embodiment of the present invention.

FIG. 2B is a rear perspective view of the handheld terminal shown in FIG. 2A according to an embodiment of the present invention.

As shown in FIG. 2B, a camera 121' is additionally attached to the rear side of the terminal body, that is, the rear case 102. In this configuration, the camera 121' has a photographing direction that is opposite to that of the camera 121 shown in FIG. 2A and can have pixels different from those of the camera 121 shown in FIG. 2A.

For example, it is preferable that the camera 121 has sufficiently low resolution for carrying out the task of capturing an image of the face of a user and transmitting the image to a receiving part during video telephony while the camera 121' has sufficiently high resolution since it captures an image of a general object and does not immediately transmit the image in many situations. The cameras 121 and 121' can also be attached to the terminal body such that they can be rotated or popped up.

A flash bulb 123 and a mirror 124 are additionally arranged close to the camera 121'. The flash bulb 123 lights an object when the camera 121' takes a picture of the object, and the mirror 124 is used for the user to look at his or her face when the user wants to take a picture of himself or herself using the camera 121'.

An audio output unit 152' can be additionally provided on the rear side of the terminal body. In this embodiment, the audio output unit 152' can achieve a stereo function with the audio output unit 152 shown in FIG. 2A and be used to implement a speaker phone mode when the terminal is used for a telephone call.

A broadcasting signal receiving antenna 124 can be attached to a side of the terminal body in addition to an antenna for telephone calls. The antenna forming a part of the broadcasting receiving module 111 shown in FIG. 1 can be installed in the terminal body such that the antenna can be pulled out of the terminal body.

The power supply 190 for providing power to the handheld terminal 100 is installed in the terminal body. The power supply can be built inside the terminal body or installed as a power supply removable directly from the exterior of the terminal body.

A touch pad 135 for sensing touch can be additionally installed to the rear case 102 of the terminal 100. Like the display unit 151, the touch pad 135 can also built as a light transmission type. In this case, if the display unit 151 outputs visual information through both sides, the visual information can also be recognized through the touch pad 135. The information output through both sides of the display unit 151 can be controlled by the touch pad 135. On the other hand, a display can be additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The size of the rear-side touch panel 135 can be identical to or smaller than the display unit 151.

In what follows, interoperations of the display unit 151 and the touch pad 135 will be described with reference to FIGS. 3A and 3B.

Figure 3A:
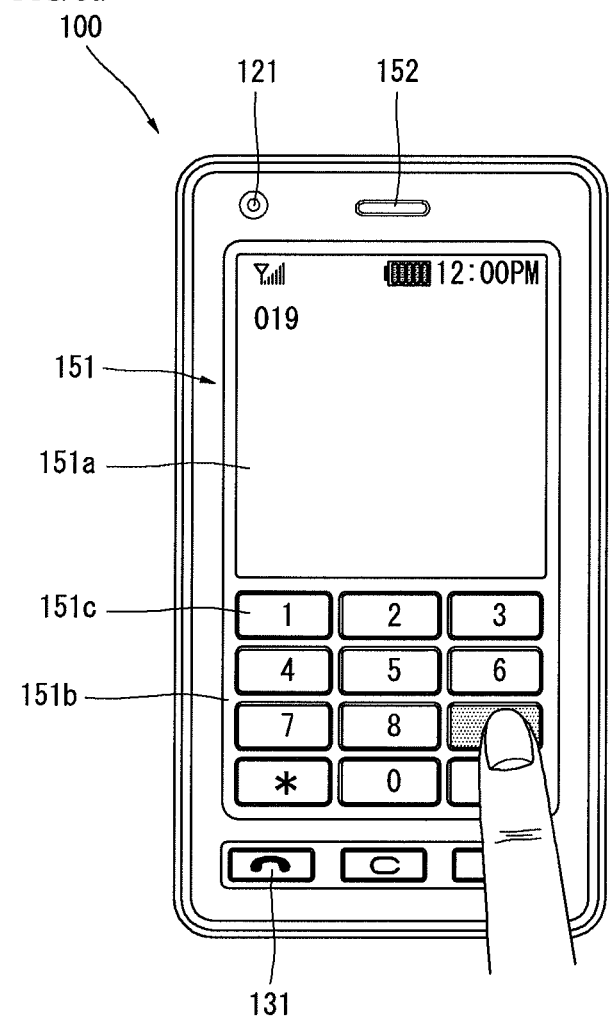
FIGS. 3A and 3B are front views of the handheld terminal 100 and are used for explaining an operating state of the handheld terminal according to an embodiment of the present invention.
Figure 3B:
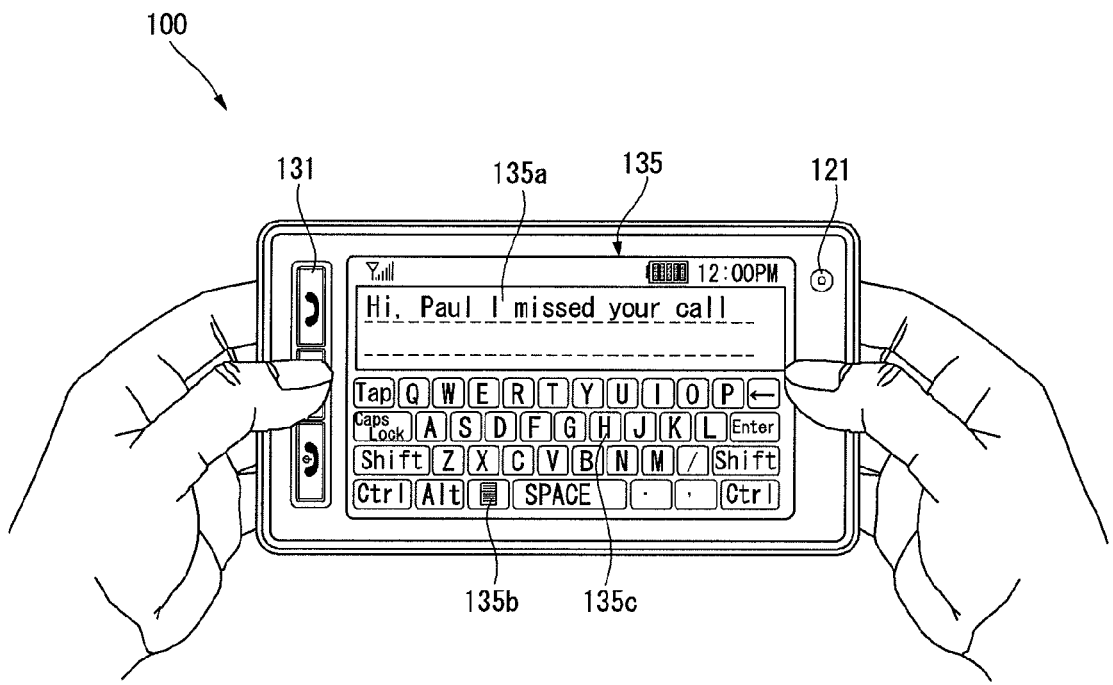

FIGS. 3A and 3B are front views of the handheld terminal 100 and are used for explaining an operating state of the handheld terminal according to an embodiment of the present invention.

The display unit 151 can display various types of visual information in the form of characters, numerals, symbols, graphic or icons.

To input the information, at least one of the characters, numerals, symbols, graphic and icons are displayed in a predetermined arrangement to form a keypad. Such a keypad can be referred to as a 'soft key'.

FIG. 3A illustrates a situation where touch applied to a soft key is input through the front side of the terminal body.

The display unit 151 can be a single area or can be divided into a plurality of regions. In the latter case, the display unit 151 is constructed such that the plurality of regions operate in association with each other For example, an output window 151A and an input window 151B are displayed respectively in the upper and lower part of the display unit 151. The input window 151B displays soft keys 151C with figures to input numbers such as telephone numbers. Thus, when a soft key 151C is touched, a numeral corresponding to the touched soft key is displayed on the output window 151A. When the user operates the first operating unit 131, a connection for a call corresponding to the telephone number displayed on the output window 151A is attempted.

FIG. 3B illustrates a situation where a touch applied to soft keys is input through the rear side of the terminal body. FIG. 3B illustrates a terminal display in landscape whereas FIG. 3A shows a terminal display in portrait. The display unit 151 can be constructed such that an output image is converted according to the orientation of the terminal body.

FIG. 3B shows the operation of the handheld terminal in a text input mode. As shown in the figure, an output window 135A and an input window 135B are displayed in the display unit 151. A plurality of soft keys 135C indicating at least one of characters, symbols, and numerals can be arranged in the input window 135B. Further, in this embodiment, the soft keys 135C are arranged in the form of QWERTY keys.

When the soft keys 135C are touched through the touch pad 135, the characters, numerals, and symbols corresponding to the touched soft keys 135C are displayed on the output window 135A. Touch input through the touch pad 135 can prevent the soft keys 135C from being obscured by the user's fingers when the soft keys 135C are touched as compared to touch input through the display unit 151. Further, when the display unit 151 and the touch pad 135 are transparent, the user can see his or her fingers located behind the terminal body and thus can select items more accurately.

In addition to the input methods described in the above embodiments, the display unit 151 or the touch pad 135 can also accept touch inputs through scroll operations. The user can scroll the display unit 151 or the touch pad 135 to move an object displayed on the display unit 151, for example a cursor or a pointer located on an icon. Also, when the user moves his or her finger on the display unit 151 or the touch pad 135, the controller 180 can visually display the movement path of the user's finger on the display unit 151. This is a useful feature for editing an image displayed on the display unit 151.

When the display unit 151 (touch screen) and the touch pad 135 are simultaneously touched within a predetermined period of time, a specific function of the terminal can be executed. For example, the user can clamp the terminal body using his or her thumb and index finger. The specific function can be activating or deactivating the display unit 151 or the touch pad 135.

The proximity sensor described with reference to FIG. 1 will now be explained in more detail with reference to FIG. 4.

Figure 4:
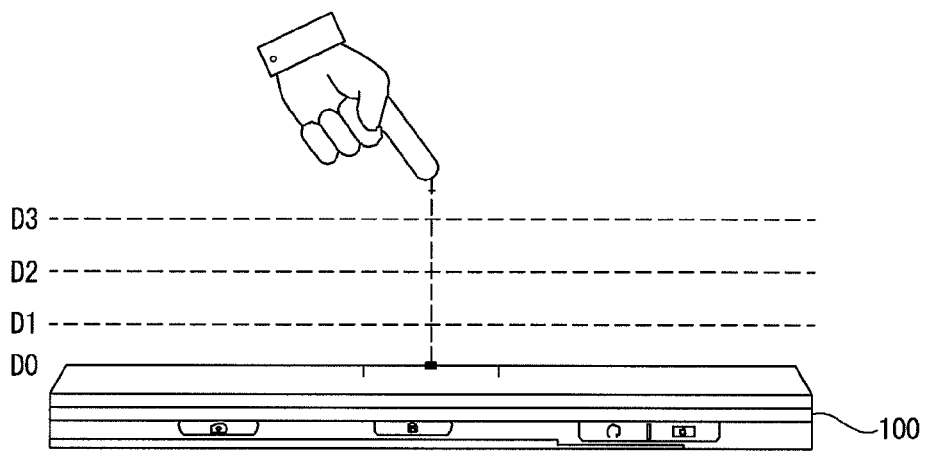
FIG. 4 is a conceptual diagram used for explaining a proximity depth of the proximity sensor.

FIG. 4 is a conceptual diagram used for explaining a proximity depth of the proximity sensor.

As shown in FIG. 4, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (hereinafter, it is referred to as "proximity depth").

The distance at which the proximity signal is output when the pointer approaches the touch screen is referred to as a detection distance. The proximity depth can be determined using a plurality of proximity sensors having different detection distances and comparing proximity signals output from the respective proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

To be specific, when the pointer completely comes into contact with the touch screen (D0), the controller 180 recognizes this action as the contact touch. When the pointer is located within a distance D1 from the touch screen, the controller 180 recognizes this action as a proximity touch of a first proximity depth. When the pointer is located between the distance D1 and a distance D2 from the touch screen, the controller 180 recognizes this action as a proximity touch of a second proximity depth. When the pointer is located between the distance D2 and a distance D3 from the touch screen, the controller 180 recognizes this action a proximity touch of a third proximity depth. Also, when the pointer is located at the distance longer than D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

In the following, embodiments of the present invention will be described.

Figure 5:
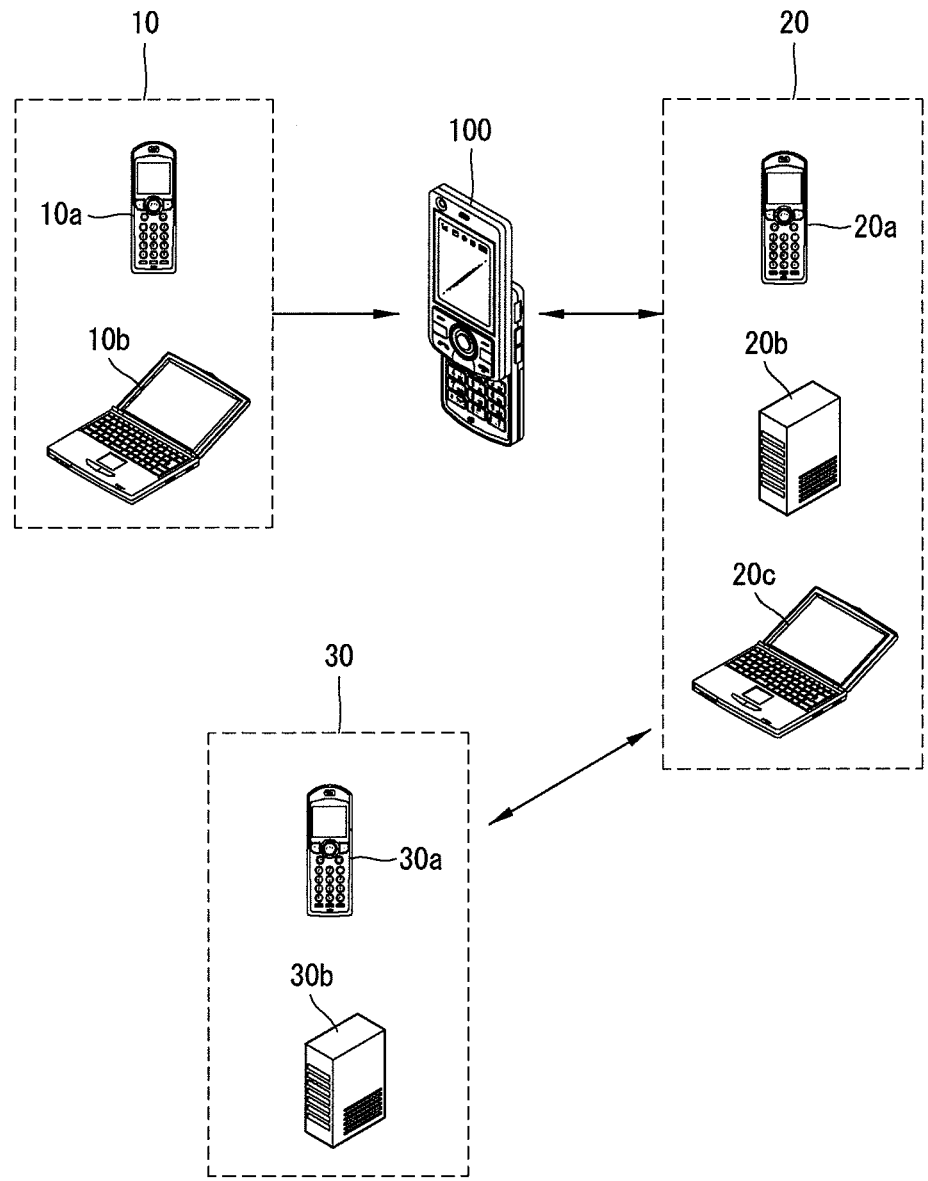
FIG. 5 illustrates the environment or an example of a communication system to which embodiments of the present invention can be applied.

FIG. 5 illustrates the environment or an example of a communication system to which embodiments of the present invention can be applied. The present invention assumes that the user has lost the mobile terminal 100. In some circumstances, third person can pick up the mobile terminal 100.

Referring to FIG. 5, the environment to which embodiments of the present invention can be applied can include the mobile terminal described with reference to FIGS. 1 to 4, a first terminal 10, a second terminal 20, and a third terminal 30.

The first terminal 10 represents a terminal that can control the mobile terminal 100 remotely. A method for controlling the mobile terminal 100 remotely can be realized by using various prior techniques. In the document, therefore, a detailed description about a method for controlling the mobile terminal 100 remotely is not provided. However, the first terminal 10 that can control the mobile terminal 100 remotely, as shown in FIG. 5, can take various forms such as a mobile communication terminal 10A like a mobile phone and a personal computer like a notebook computer.

The second terminal 20 can communicate with the mobile terminal 100 and when the mobile terminal 100 performs a communication function by using the wireless communication unit 100, acts as a receiver terminal with respect to the communication function. The second terminal 20 can take various forms in the same manner as the first terminal 10 or the third terminal 30 described below. For example, the second terminal 20 can be a mobile terminal 20A that has the same or identical structure of the mobile terminal 100, a server 20B connected to the Internet, or a personal computer 20C.

The third terminal 30, as described below, represents a terminal corresponding to the contact point at which the user of the mobile terminal 100 can be reached in the case when the mobile terminal 100 is lost. For example, the third terminal 30 can be another mobile terminal 30A owned by the user, a mail server or a personal computer 30B through which the user can receive an e-mail, a line telephone, or a cordless telephone (not shown).

In the document, communication methods between individual terminals illustrated in FIG. 5 are not specified. In the document, therefore, a detailed description about communication methods between the respective terminals is not provided. Also, as described above, various forms of the first to third terminal 10, 20, 30 are allowed in the document.

Figure 6:
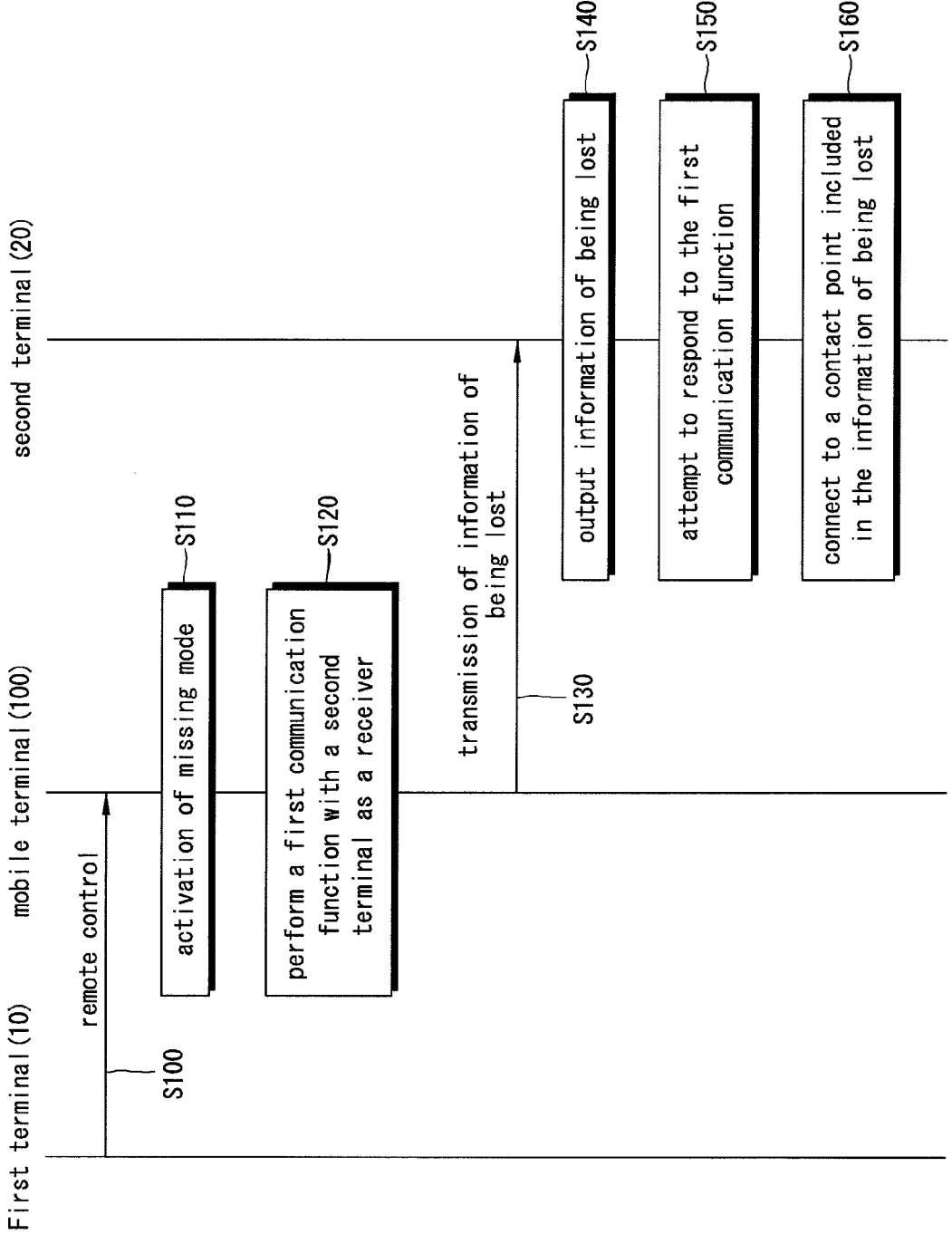
FIG. 6 illustrates a flow diagram of a method for managing a missing mode of a communication system according to a first embodiment of the present invention.

FIG. 6 illustrates a flow diagram of a method for managing a missing mode of a communication system according to a first embodiment of the present invention. For the reader's convenience, the method for managing a missing mode of a communication system according to a first embodiment of the present invention is described with reference to FIG. 5. However, one skilled in the art would know that the following features may be applied to any type of mobile communication terminal or network. In the following, a method for managing a missing mode of a communication system according to a first embodiment of the present invention, the mobile terminal 100 to implement the method, and operations of the first terminal 10 and the second terminal 20 are described in detail with necessary drawings.

The first terminal 10 remotely controls the mobile terminal 100 to activate a missing mode of the mobile terminal 100 (S100).

The mobile terminal 100 activates the missing mode in response to the remote control from the first terminal 10 (S110).

The missing mode may be off under normal conditions. The missing mode can manage information relating to being lost to be used when the mobile terminal 100 is lost. The user can edit the information relating to being lost by inputting or modifying the information relating to being lost while the missing mode is off.

Figure 7:
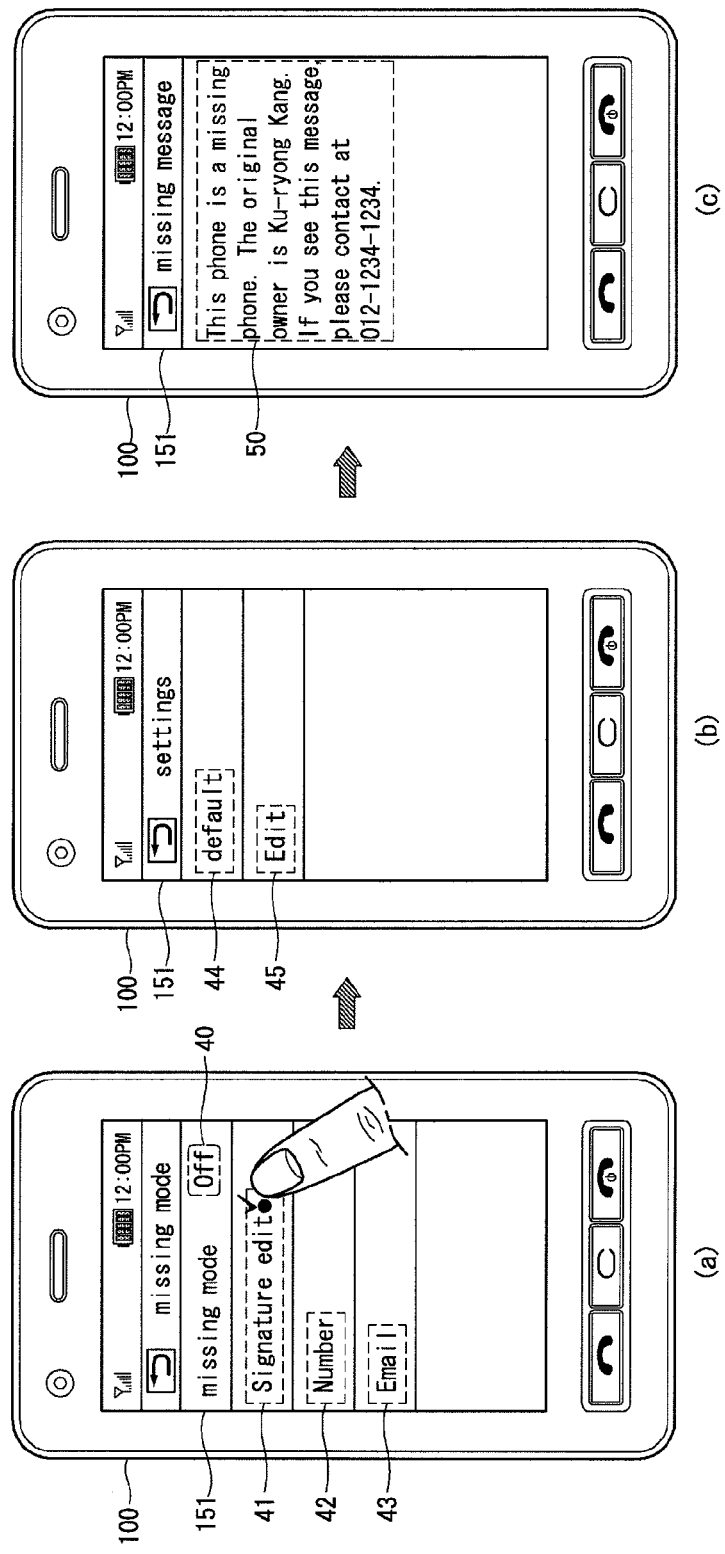
FIG. 7 illustrates an example of a screen where information relating to being lost is edited.

FIG. 7 illustrates an example of a screen where information relating to being lost is edited. The information relating to being lost can include a message related to being lost and information about a particular contact point.

The message related to being lost, when the mobile terminal 100 is lost, includes information for notifying that the mobile terminal 100 has been lost.

The message related to being lost, as implemented in the various embodiments described below, if a communication function of the mobile terminal 100 is carried out while the missing mode is activated, can be transmitted to a receiver terminal corresponding to the communication function being carried out. In what follows, descriptions are given under the assumption that the second terminal 20 is the receiver terminal.

Referring to FIG. 7A, while the missing mode is off, the user, by operating the user input unit 130, can switch to a screen where the information relating to being lost can be edited. As shown in FIG. 7A, the controller 180 can provide a first menu 41 for switching to a screen where the message related to being lost is edited, a second menu 42 for switching to a screen where phone numbers are edited, and a third menu 43 for switching to a screen where e-mails are edited.

If the user selects the first menu 41, as shown in FIG. 7B, a 1-1 menu 44 and a 1-2 menu 45 corresponding to the submenus of the first menu 41 can be provided. The 1-1 menu 44 corresponds to the menu for setting up to transmit a message related to being lost already stored in the memory 160 when the user has not input his or her message related to being lost. The 1-2 menu 45 corresponds to the menu for switching to a screen where the user can input or edit a message related to being lost according to his or her intention. FIG. 7C illustrates an example of the message related to being lost 50 to be transmitted to the second terminal 20 after the missing mode is activated.

The particular contact point corresponds to the third terminal 30 and can be a particular phone number or e-mail address. The user can input or edit a phone number and/or e-mail address corresponding to the third terminal 30 through the second menu 42 and the third menu 43.

When the missing mode is activated, the information relating to being lost cannot be edited through the user input unit 130 installed to the mobile terminal 100. Instead, after the missing mode is activated, the information relating to being lost can be edited only by the remote control. The aforementioned feature has been devised to prevent a third person who has picked up the missing mobile terminal 100 from editing the information relating to being lost at his or her own will.

The information relating to being lost can be displayed in various forms as implemented in the various embodiments described later. For example, the information relating to being lost can be displayed visually in the form of text or an image or an audible output (e.g., in the form of a voice) at first terminal 10 or another remote terminal.

However, when the missing mode is activated by remote control, the information relating to being lost is not displayed visually or audibly in the mobile terminal 100. In order for the information relating to being lost to be displayed in the mobile terminal 100, the missing mode should be turned off. This prevents a third person from seeing the information relating to being lost, and knowing that a missing mode is activated.

The mobile terminal 100 can perform a first communication function with the second terminal as a receiver (S120).

Examples of the first communication function are transmitting a message including at least one of an instant message, short message service (SMS), multimedia messaging system (MMS), and e-mail; sending a call including at least one of voice communication or video communication; and transmitting data including at least one of a text, an image, and moving images. Examples of the first communication function are described in more detail in the subsequent embodiments.

The mobile terminal 100, as the first communication function is carried out, transmits the information relating to being lost to the second terminal 20 (S130). Also, the information relating to being lost, as implemented in the embodiments described later, can be transmitted to the receiver terminal or displayed at various points of time. For example, the information relating to being lost can be transmitted when the mobile terminal 100 tries to communicate to the second terminal 20. Also, the information relating to being lost can be transmitted when a communication channel is established between the mobile terminal and the second terminal 20. The transmitted information relating to being lost, as described above, includes the message related to being lost. Also, the transmitted information relating to being lost can further include the contact point.

In addition, the transmitted information relating to being lost can include at least one control code. For example, the information relating to being lost can include a control code to designate the contact point as a receiver. Also, the information relating to being lost, depending on the data type transmitted from the mobile terminal 100, can include a control code specifying the transmitted data not to be displayed in the second terminal 20, a control code specifying the transmitted data not to be accessed by the second terminal 20, or a control code specifying a particular field of the transmitted data to be displayed being replaced with the message related to being lost.

The second terminal 20, recognizing the execution of the first communication function attempted by the mobile terminal 100, can receive and output the information relating to being lost (S140).

At this time, the information relating to being lost can be displayed visually or audibly through output components installed in the second terminal 20. The user of the second terminal, through the output of the information relating to being lost, can know that the mobile terminal 100 is lost.

The second terminal 20 can carry out a second communication function to respond to the first communication function (S150), one example of which is the case when the second terminal 20 attempts to respond to the SMS received from the mobile terminal 100.

The second terminal 20 designates the contact point included in the information relating to being lost received from the mobile terminal 100 as a receiver; and a response to the first communication function is then transmitted to the third terminal 30 corresponding to the contact point (S160).

The S160 step can be executed by the control code included in the information relating to being lost received from the mobile terminal 100. Also, the second terminal 20, recognizing the mobile terminal 100 as a missing terminal through the message related to being lost, can carry out step S160 independently of the control code.

Meanwhile, the mobile terminal 100 can transmit the operation of the mobile terminal 100 to the contact point after the missing mode is activated. For example, the mobile terminal 100 can record the history of use of the menu of the mobile terminal 100 by a third person who has picked up and attempted to use the lost mobile terminal 100, the history of use of various functions provided by the mobile terminal 100, and the like in the form of a log file and transmit the log file to the e-mail address designated by the original owner of the mobile terminal 100.

At this point, the ability for the log file transmitted to the e-mail address each time a particular function of the mobile terminal 100 is carried out can be set up beforehand. For example, the ability for the log file to be transmitted to the e-mail address only when pay functions are carried out can be set up beforehand.

In the following, embodiments in which the first embodiment of the present invention is implemented are described in detail. The embodiments described below focus on the operations of the mobile terminal 100 and the second terminal 20.

Transmission of a Message Such as SMS, MMS, or e-Mail

Figure 8:
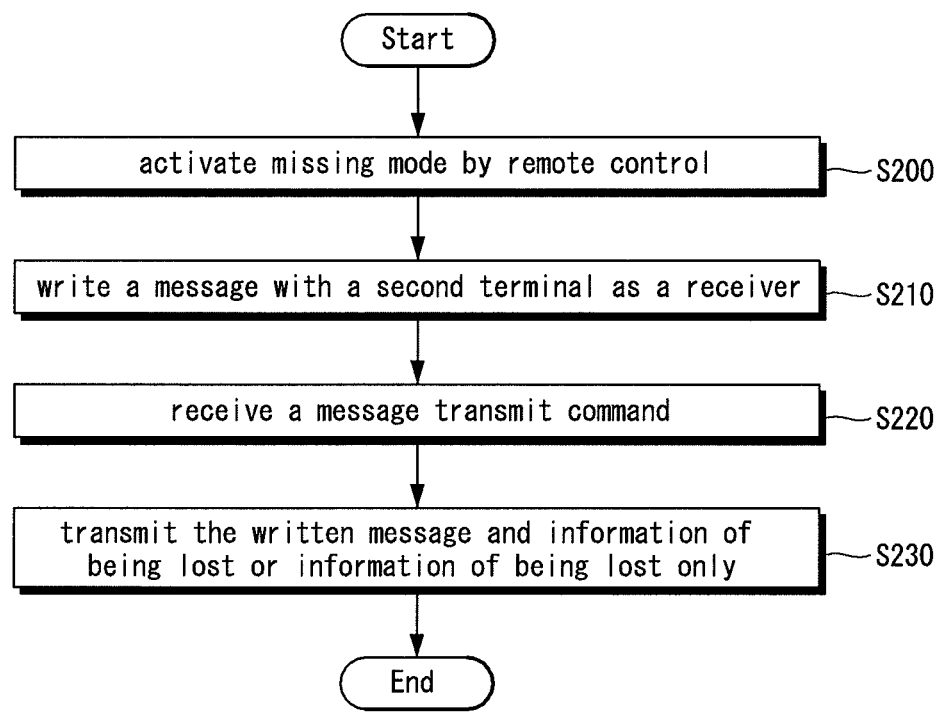
FIG. 8 illustrates a flow diagram of a method for managing a missing mode of a mobile terminal according to a second embodiment of the present invention.

FIG. 8 illustrates a flow diagram of a method for managing a missing mode of a mobile terminal according to a second embodiment of the present invention. A method for managing a missing mode of a mobile terminal according to a second embodiment of the present invention can be implemented in the mobile terminal 100 described with reference to FIGS. 1 to 4 and can be applied to the environment described with reference to FIG. 5.

In what follows, with reference to necessary drawings, a method for managing a missing mode of a mobile terminal according to a second embodiment of the present invention and the operations of the mobile terminal 100 to implement the method are described in detail. Along therewith, the operations of the second terminal 20 coupled with a method for managing a missing mode of a mobile terminal according to a second embodiment of the present invention are described.

A second embodiment of the present invention implements the case when the first communication function described in the first embodiment of the present invention corresponds to a function of transmitting a message such as SMS, MMS, or e-mail.

The controller 180 activates the missing mode by the remote control of the first terminal 10 (S200). Step S200 corresponds to step S100 and step S110 of FIG. 6.

The controller 180 writes a message specifying the second terminal 20 as a receiver (S210). For example, the user can set up the second terminal 20 as a receiver and can write a SMS or MMS message by using an application that manages SMS or MMS operations. Also, the user can set up the second terminal 20 as a receiver and write an e-mail by using an e-mail client. Writing a message via SMS, MMS, or e-mail is a well-known technique and further descriptions are not given below.

In step S220, the controller 180 receives a command to transmit the message written in step S210. For example, the user can press a transmit button prepared in the user input unit 130 to transmit the message to the second terminal 20.

The controller 180, according to the received transmit command, can transmit the written message and the information relating to being lost together to the second terminal 20 or can transmit only the information relating to being lost to the second terminal 20 excluding the written message (S230).

In step S230, the controller 180 can transmit the data by using the wireless communication unit 110. For example, the controller 180 can transmit the data in the form of a SMS or MMS message through the mobile communication module 112. Also, the controller 180 can transmit the data in the form of an e-mail through the mobile communication module 112 or the wireless Internet module 113.

Figure 9A:
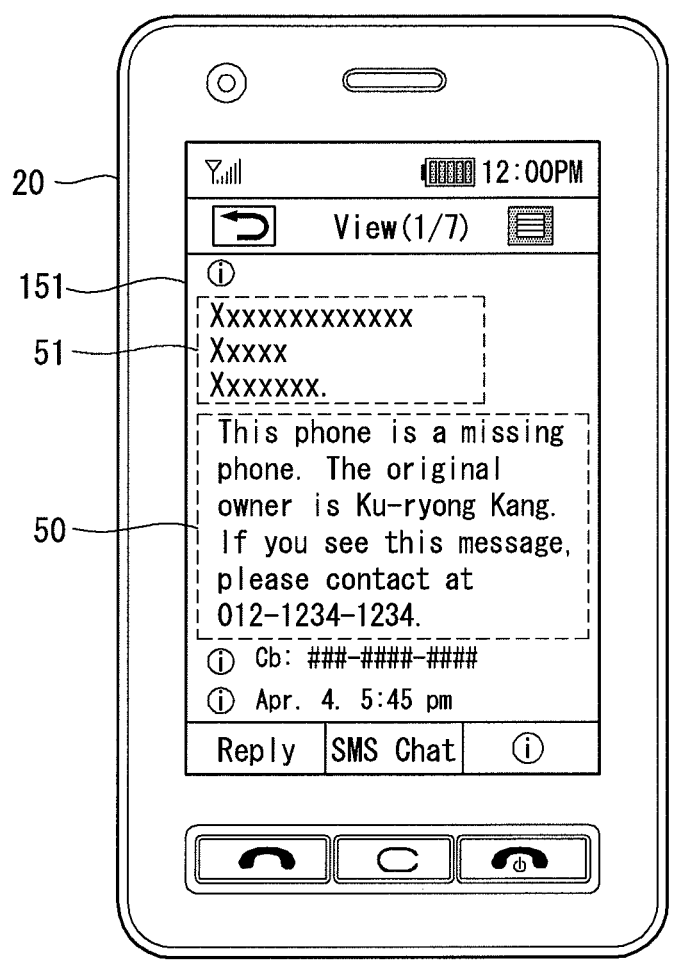
FIG. 9A illustrates an example where the SMS transmitted at the S230 step is displayed in the display unit 151 installed in the second terminal 20.

FIG. 9A illustrates an example where the SMS message transmitted at step S230 is displayed in the display unit 151 installed in the second terminal 20. With reference to FIG. 9A, the display unit 151 installed in the second terminal 20 can display both the message written at step S210 and the message related to being lost 50. The message related to being lost can be output in the form of audio through an audio output unit installed in the second terminal 20. The written message 51 may not be output in the second terminal 20. Disabling the output can be controlled either by a control code included in the information relating to being lost or a decision made by the second terminal 20 itself.

Figure 9B:
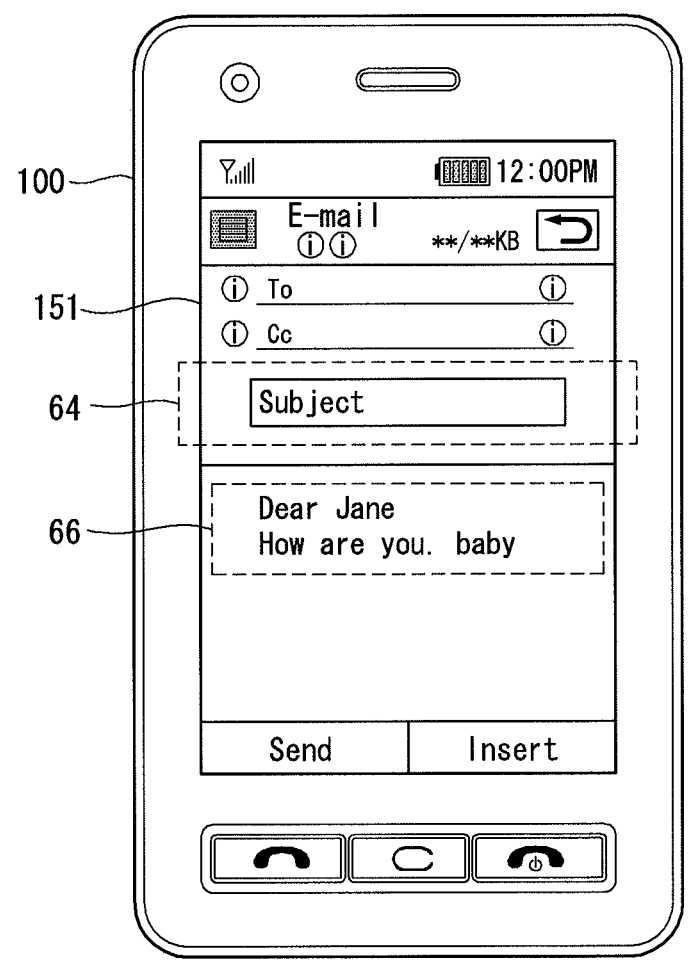
FIGS. 9B and 9C illustrate examples where an e-mail is transmitted according to the second embodiment of the present invention.
Figure 9C:
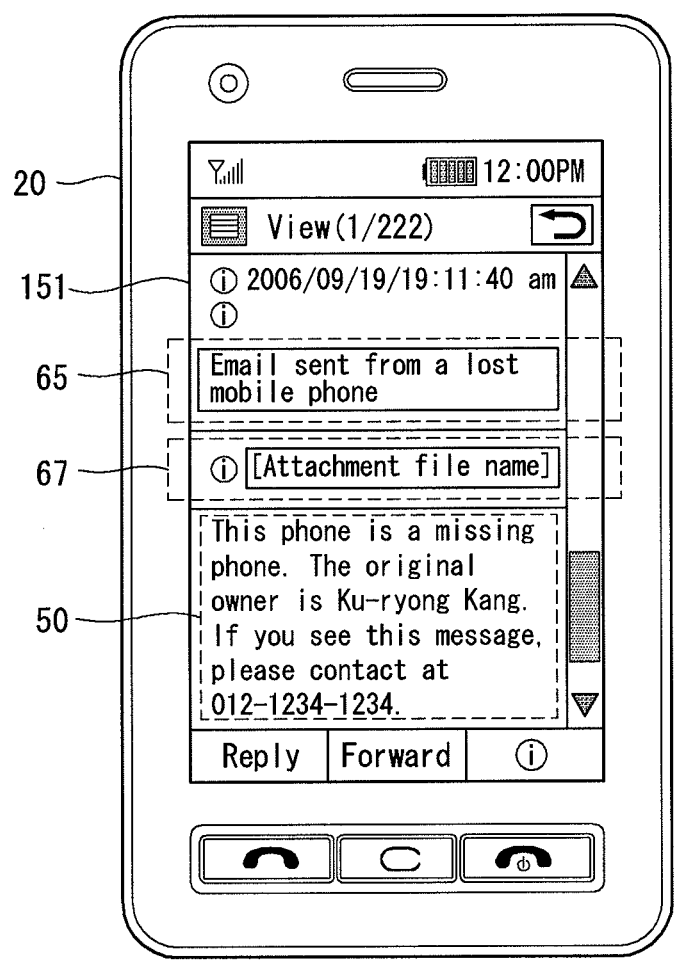

FIGS. 9B and 9C illustrate examples where an e-mail is transmitted according to the second embodiment of the present invention. FIG. 9B illustrates an example of a screen where an e-mail is written in the mobile terminal 100. With reference to FIG. 9B, the user can input the title 64 and the contents 66 of an e-mail.

FIG. 9C illustrates an example of an e-mail displayed in the second terminal 20 as steps S210 to S230 are carried out. According to the second embodiment of the present invention, as shown in FIG. 9C, the second terminal 20 can output in a title filed a first message related to being lost 65 indicating that the mobile terminal 100 that transmitted the e-mail corresponds to the lost terminal. In other words, the second terminal 20 can output the first message related to being lost 65 rather than output the title 64 of the e-mail entered into the mobile terminal 100.

Also, the second terminal 20 can output in the contents field a second message related to being lost 50 indicating that the mobile terminal 100 is the lost terminal rather than output the contents 66 of the e-mail entered into the mobile terminal 100.

The first message related to being lost 65 and the second message related to being lost 66 can be the message related to being lost included in the information relating to being lost transmitted from the mobile terminal 100. Also, the second terminal 20 can receive only the second message related to being lost 66 from the mobile terminal 100 and as the second message related to being lost 66 is received, generates the first message related to being lost 65 and output the generated first message related to being lost in the title field.

For the cases of FIGS. 9B and 9C, various conditions for the second terminal 20 to output the first message related to being lost 65 and the second message related to being lost 50 can exist.

For example, the mobile terminal 100, as a message transmit command is received from step S220, can transmit the title 64 and the contents 66 of an e-mail being replaced respectively with the first message related to being lost 65 and the second message related to being lost 50 instead of transmitting the title 64 and the contents 66 of the e-mail at step S230.

Also, the mobile terminal 100 can transmit the entire information relating to being lost including a message written at step S210, the first message related to being lost 65, and the second message related to being lost 50 to the second terminal 20. At this point, the mobile terminal 100 can transmit a control code to the second terminal 20 at step S230, the control code specifying the title 64 and the contents 66 of the e-mail to be replaced respectively with the first message related to being lost 65 and the second message related to being lost 50. The second terminal 20, according to the control code, can output the title 64 and the contents 66 of the e-mail being replaced respectively with the first message related to being lost 65 and the second message related to being lost 50.

According to the second embodiment of the present invention, the user of the second terminal 20 can know, through the messages of being lost 50, 65, that the mobile terminal 100 which transmitted a message to the user is a lost terminal.

Figure 9D:
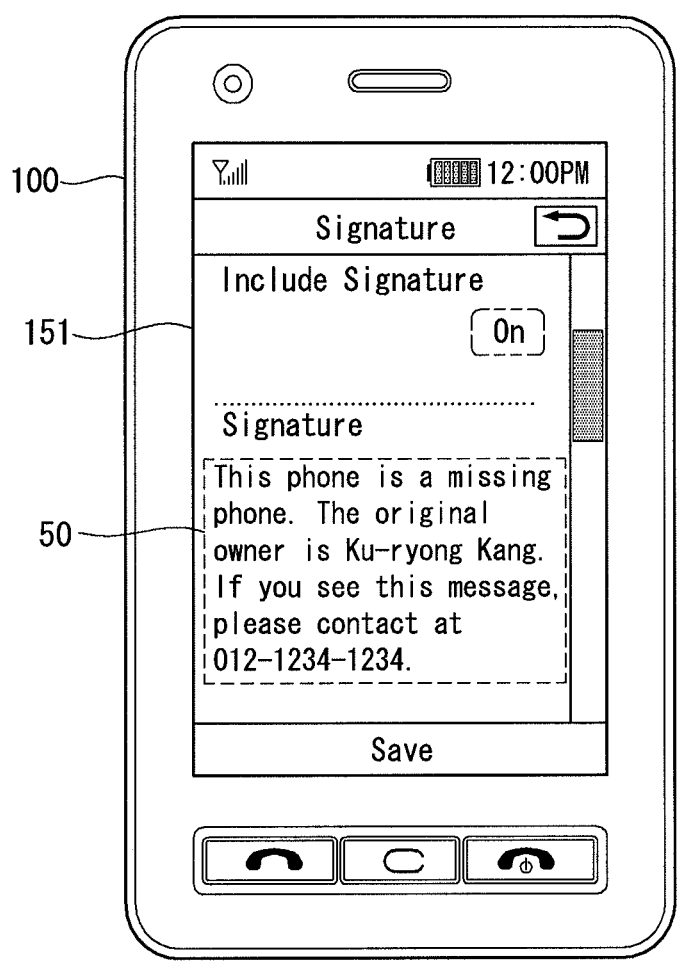
FIG. 9D illustrates an example where the message related to being lost 50 is automatically attached to an electronic signature field when the mobile terminal 100 transmits an e-mail including information relating to being lost.

FIG. 9D illustrates an example where the message related to being lost 50 is automatically attached to an electronic signature field when the mobile terminal 100 transmits an e-mail including information relating to being lost. As the message related to being lost 50 is attached to the electronic signature field, the second terminal 20 can output information in the form as shown in FIG. 9C.

Call Transmission

Figure 10:
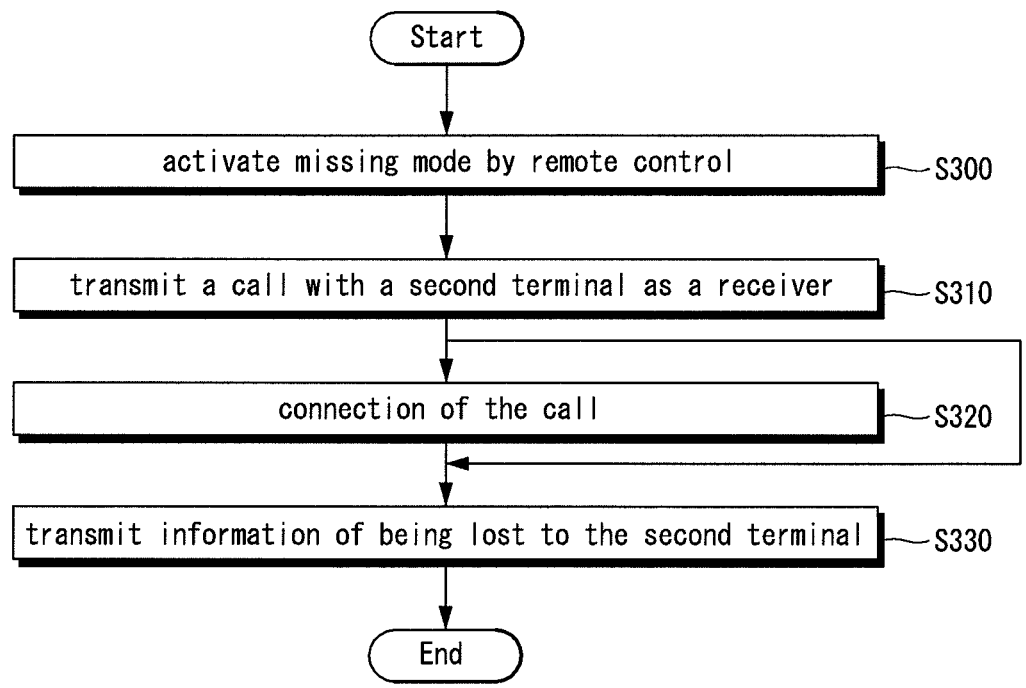
FIG. 10 illustrates a flow diagram of a method for managing a missing mode of a mobile terminal according to a third embodiment of the present invention.

FIG. 10 illustrates a flow diagram of a method for managing a missing mode of a mobile terminal according to a third embodiment of the present invention. A method for managing a missing mode of a mobile terminal according to a third embodiment of the present invention can be implemented in the mobile terminal 100 described with reference to FIGS. 1 to 4 and can be applied to the environment described with reference to FIG. 5.

In what follows, with reference to necessary drawings, a method for managing a missing mode of a mobile terminal according to a third embodiment of the present invention and the operations of the mobile terminal 100 to implement the method are described in detail. Along therewith, the operations of the third terminal 20 coupled with a method for managing a missing mode of a mobile terminal according to a second embodiment of the present invention are described.

A third embodiment of the present invention implements the case when the first communication function described in the first embodiment of the present invention corresponds to a function of transmitting a call.

The controller 180 activates the missing mode by the remote control of the first terminal 10 (S300). Step S300 corresponds to step S100 and step S110 of FIG. 6.

The controller 180 transmits a call specifying the second terminal 20 as a receiver (S310_. For example, step S310 can be carried out when the user presses a call button for transmitting a call to the second terminal.

The call transmitted at step S310 can be a call for voice communication or video communication. Also, the call transmitted at step S310 can use various communication networks. For example, the controller 180 can transmit a call through the mobile communication module 112 or the wireless Internet module 113.

The controller 180, according to the call transmission, transmits the information relating to being lost to the second terminal 20 (S330). At this point, the information relating to being lost can be transmitted at various points of time. For example, the controller 180 can transmit the information relating to being lost to the second terminal 20 immediately after the call transmission is attempted. Also, the controller 180 can transmit the information relating to being lost to the second terminal 20 after the transmitted call is connected to the second terminal 20.

Figure 11:
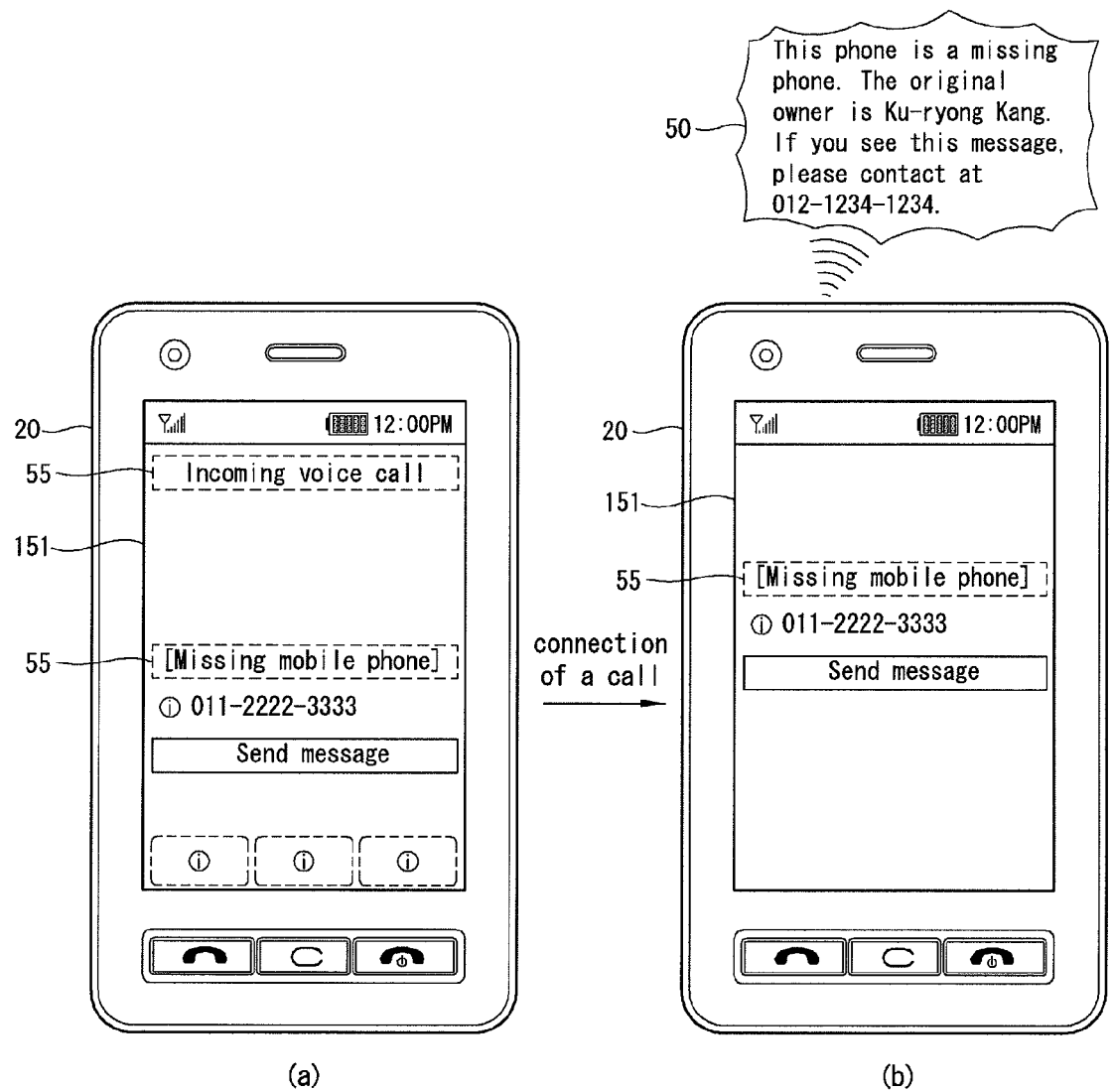
FIGS. 11 and 12 illustrate examples where a third embodiment of the present invention is implemented in the second terminal 20 for the case of a voice call.
Figure 12:
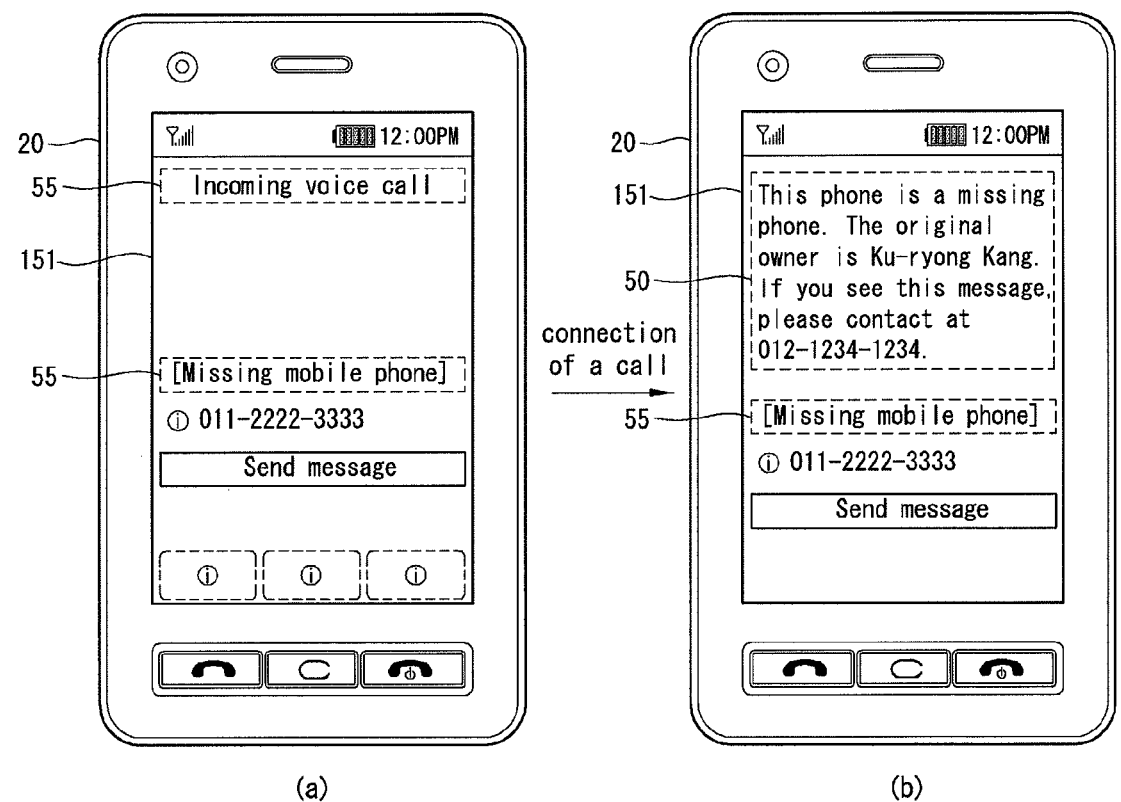

FIGS. 11 and 12 illustrate examples where a third embodiment of the present invention is implemented in the second terminal 20 for the case of a voice call.

When the mobile terminal 100 transmits a call specifying the second terminal 20 as a receiver, the second terminal 20 can display a first message related to being lost included in the information relating to being lost transmitted at step S230 (see FIG. 11A). The screen of FIG. 11A shows a situation where the second terminal 20 is receiving a voice call. And if the user of the second terminal 20 allows a connection of the transmitted call, the second message related to being lost 50 included in the information relating to being lost can be output in the form of audio information (see FIG. 11B). Different from FIG. 11, FIG. 12 illustrates the case where the second message related to being lost is output in the form of visual information.

Figure 13:
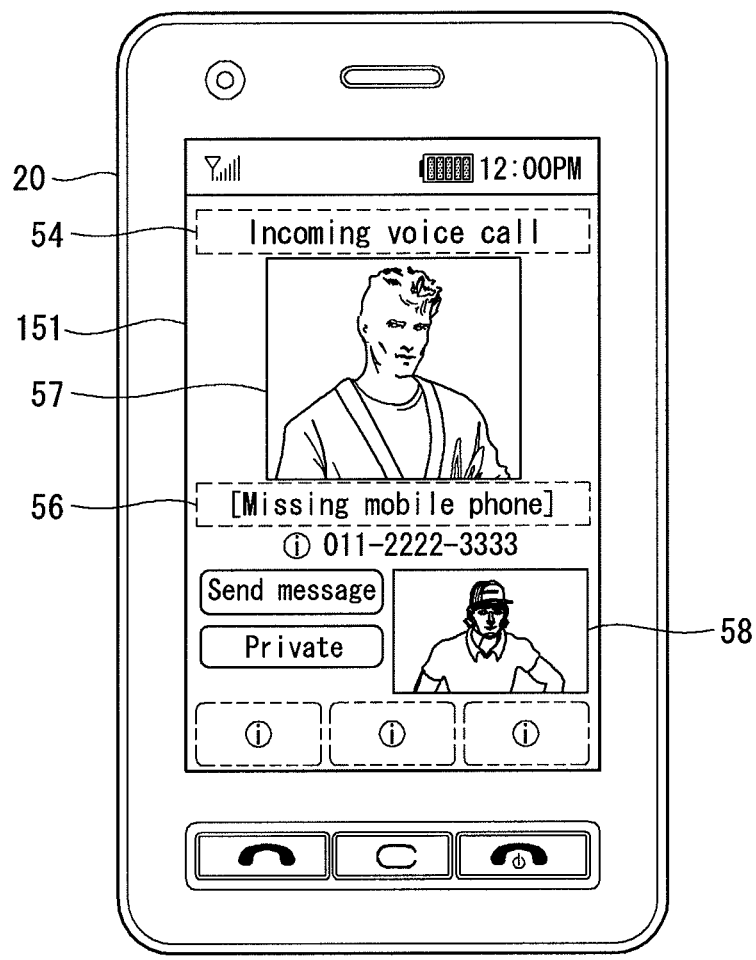
FIGS. 13 to 15 illustrate examples where the third embodiment of the present invention is implemented in the second terminal 20 for the case of an image call.
Figure 14:
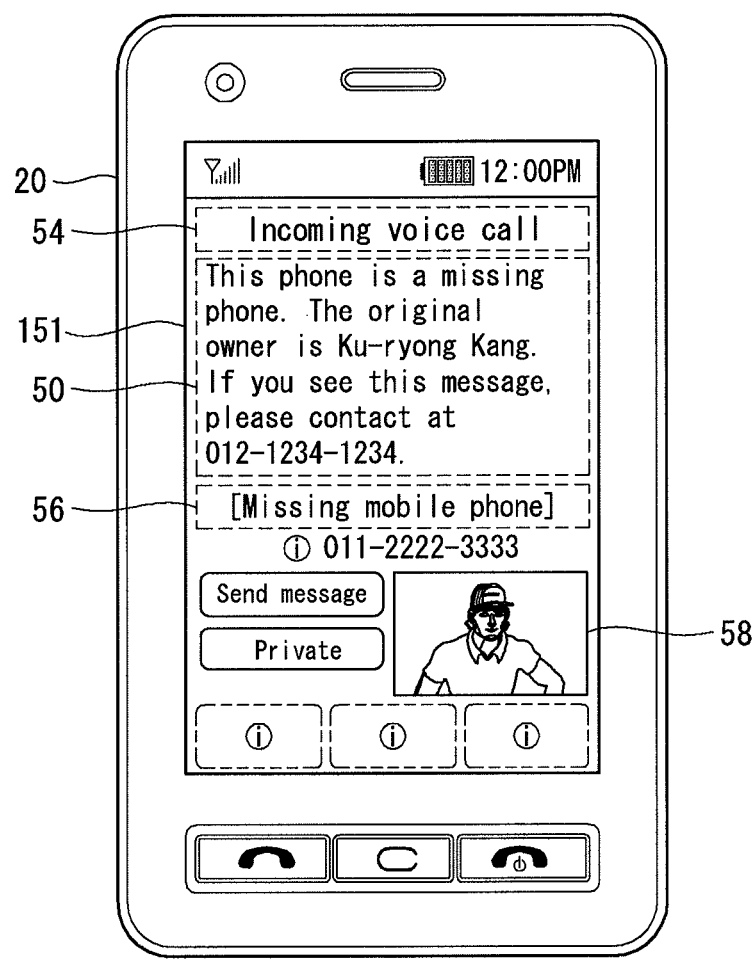
Figure 15:
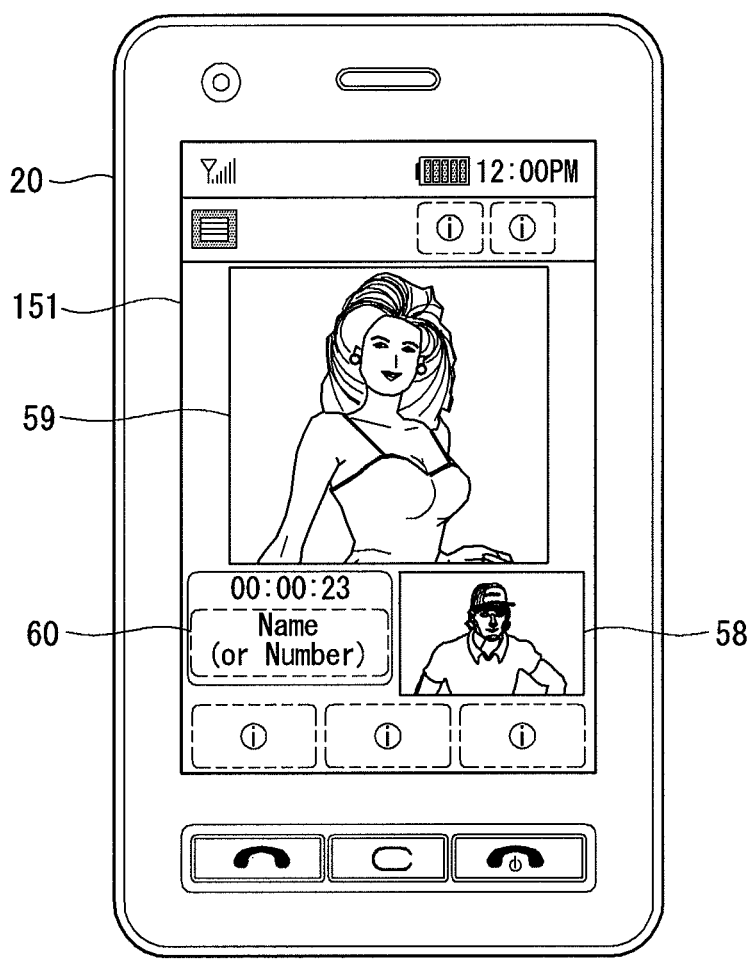

FIGS. 13 to 15 illustrate examples where the third embodiment of the present invention is implemented in the second terminal 20 for the case of an image call.

FIG. 13 illustrates a screen notifying that the second terminal 20 is receiving an image call from the mobile terminal 100. The screen of FIG. 13 can display an image 54 corresponding to the mobile terminal 100 and an image 58 corresponding to the second terminal 20. Also, the second terminal 20 can display a first image of being lost 56 included in the information relating to being lost transmitted at the S230 step.

FIG. 14 illustrates a situation where a second message related to being lost 50 included in the information relating to being lost is displayed instead of the image 54 corresponding to the mobile terminal 100 when the second terminal 20 receives an image call from the mobile terminal 100.

FIG. 15 illustrates a situation where an image call is established between the mobile terminal 100 and the second terminal 20. With reference to FIG. 15, the second terminal 20 can display the image 59 of the other party being received in real time, the image of the user of the second terminal 20, and information relating to being lost 60.

The third embodiment of the present invention, too, as in the second embodiment of the present invention, can include a control code for the second terminal 20 to control and manage the output of the information relating to being lost. In other words, the mobile terminal 100 can transmit the control information to the second terminal 20. The second terminal 20 can control the information relating to being lost based on the control information.

Instant Messenger Connection

Figure 16:
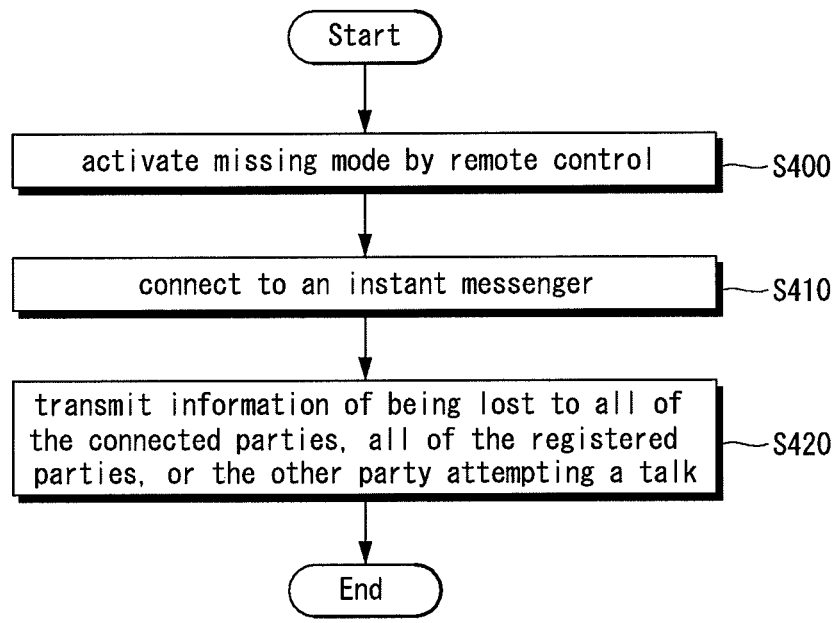
FIG. 16 illustrates a flow diagram of a method for managing a missing mode of a mobile terminal according to a fourth embodiment of the present invention.

FIG. 16 illustrates a flow diagram of a method for managing a missing mode of a mobile terminal according to a fourth embodiment of the present invention. A method for managing a missing mode of a mobile terminal according to a fourth embodiment of the present invention can be implemented in the mobile terminal 100 described with reference to FIGS. 1 to 4 and can be applied to the environment described with reference to FIG. 5.

In what follows, with reference to necessary drawings, a method for managing a missing mode of a mobile terminal according to a fourth embodiment of the present invention and the operations of the mobile terminal 100 to implement the method are described in detail. Along therewith, the operations of the fourth terminal 20 coupled with a method for managing a missing mode of a mobile terminal according to a second embodiment of the present invention are described.

A fourth embodiment of the present invention implements the case when the first communication function described in the first embodiment of the present invention corresponds to a function of transmitting an instant message. To implement the fourth embodiment of the present invention, activation of an instant messenger for transmitting and receiving the instant message may be needed.

The controller 180 activates the missing mode by the remote control of the first terminal 10 (S400). Step S400 corresponds to step S100 and step S110 of FIG. 6.

Figure 17:
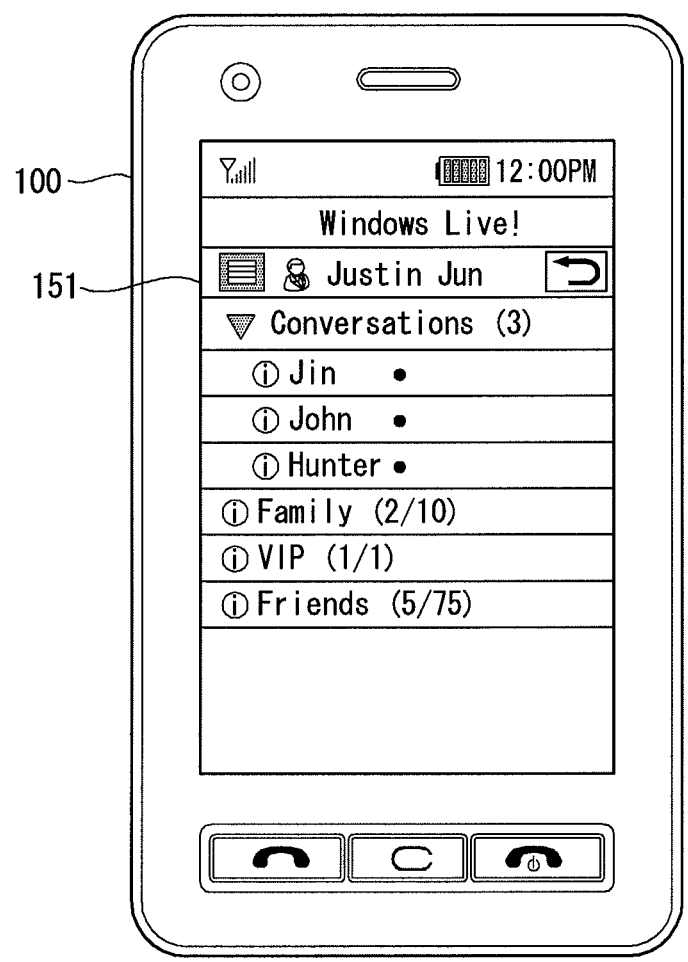
FIG. 17 illustrates an example of a screen where the controller 180 is connected to an instant messenger.

The controller 180 connects to an instant messenger (S410). FIG. 17 illustrates an example of a screen where the controller 180 is connected to an instant messenger.

The controller 180, according to the connection of the instant messenger, transmits information relating to being lost to all of the other parties connected to the instant messenger, all the other registered parties, or the other party who attempts a talk (S420). The attempt for a talk can be accommodated by either of the mobile terminal 100 or the second terminal 20.

Figure 18:
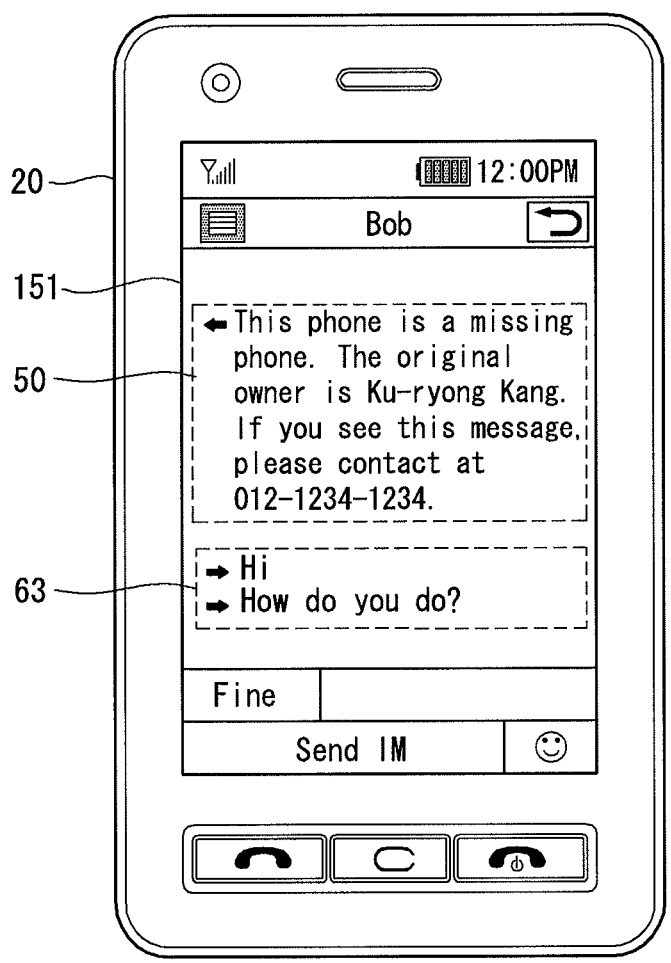
FIG. 18 illustrates an example of a screen when the terminal of the other party is connected to an instant messenger.

FIG. 18 illustrates an example of a screen when the terminal of the other party is connected to an instant messenger. With reference to FIG. 18, the second terminal 20 can display the message related to being lost 50 included in the information relating to being lost transmitted from the mobile terminal 100 and the contents of a conversation 63.

The fourth embodiment of the present invention, too, as in the second embodiment of the present invention, can include a control code for the second terminal 20 to control and manage the output of the information relating to being lost. In other words, the mobile terminal 100 can transmit the control information to the second terminal 20. The second terminal 20 can control the information relating to being lost based on the control information.

Contents Transmission

Figure 19:
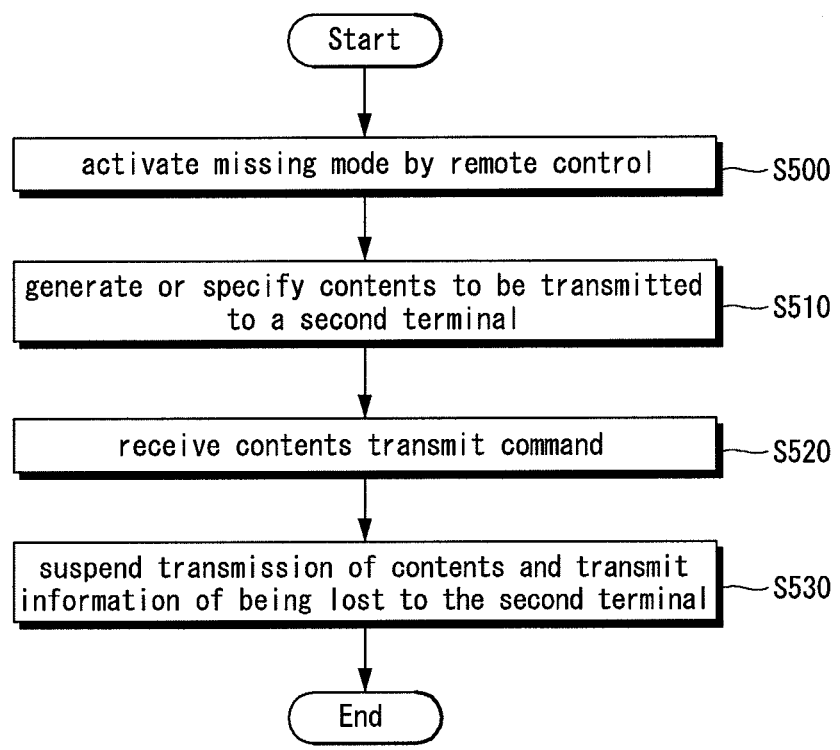
FIG. 19 illustrates a flow diagram of a method for managing a missing mode of a mobile terminal according to a fifth embodiment of the present invention.

FIG. 19 illustrates a flow diagram of a method for managing a missing mode of a mobile terminal according to a fifth embodiment of the present invention. A method for managing a missing mode of a mobile terminal according to a fifth embodiment of the present invention can be implemented in the mobile terminal 100 described with reference to FIGS. 1 to 4 and can be applied to the environment described with reference to FIG. 5.

In what follows, with reference to necessary drawings, a method for managing a missing mode of a mobile terminal according to a fifth embodiment of the present invention and the operations of the mobile terminal 100 to implement the method are described in detail. Along therewith, the operations of the fifth terminal 20 coupled with a method for managing a missing mode of a mobile terminal according to a second embodiment of the present invention are described.

A fifth embodiment of the present invention implements the case when the first communication function described in the first embodiment of the present invention corresponds to a function of transmitting contents such as text, audio, and moving images. To implement the fifth embodiment of the present invention, activation of an application for transmitting the contents may be needed.

The controller 180 activates the missing mode by the remote control of the first terminal 10 (S500). Step S500 corresponds to step S100 and step S110 of FIG. 6.

The controller 180 generates or stores contents to be transmitted to the second terminal 20 (S510). The contents can include text, still images, moving images, audio, and the like. For example, the fifth embodiment can correspond to a situation where the other party who has picked up the missing mobile terminal 100 tries to upload the contents stored in the mobile terminal 100 to a website.

The controller 180 receives a command for transmitting specified contents or the contents generated at step S510 (S520). And the controller 180, after receiving the transmit command, can suspend transmission of the contents and transmits the information relating to being lost to the second terminal (S530). For example, if the other party attempts to upload particular contents stored in the mobile terminal 100 to a particular website, the information relating to being lost can be transmitted to the particular website instead of the particular contents being uploaded to the particular website.

The fifth embodiment of the present invention, too, as in the second embodiment of the present invention, can include a control code for the second terminal 20 to control and manage the output of the information relating to being lost. In other words, the mobile terminal 100 can transmit the control information to the second terminal 20. The second terminal 20 can control the information relating to being lost based on the control information.

Figure 20:
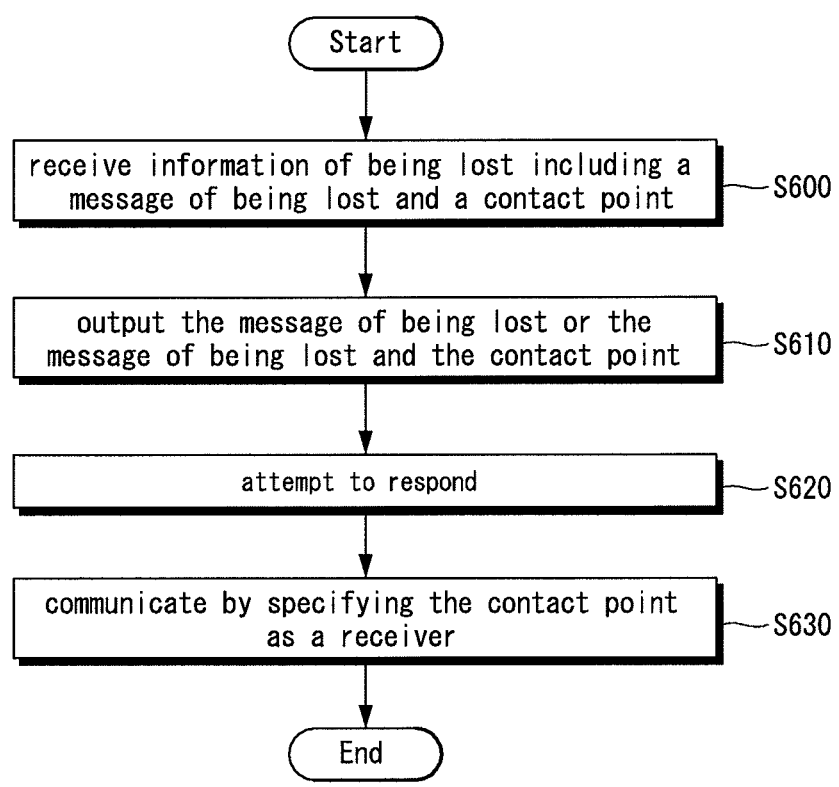
FIG. 20 illustrates a flow diagram of a method for managing a missing mode of a mobile terminal according to a sixth embodiment of the present invention.

FIG. 20 illustrates a flow diagram of a method for managing a missing mode of a mobile terminal according to a sixth embodiment of the present invention. A method for managing a missing mode of a mobile terminal according to a sixth embodiment of the present invention can be implemented in the aforementioned second terminal 20 and can be applied to the environment described with reference to FIG. 5.

The second terminal 20 receives information relating to being lost including the message related to being lost and the contact point from the mobile terminal 100 (S600). As described earlier, the contact point can include at least either of a phone number and an e-mail address. At this point, the received information relating to being lost can include control information including at least one control code described above.

Step S600 can including receiving a communication connection request or a message from the mobile terminal 100; step S600 can further include establishing communication with the mobile terminal 100 according to the communication connection request.

The second terminal 20 can output the message related to being lost or output the message related to being lost together with the contact point (S610). At this point, the second terminal 20 can carry out step S610 according to the control information included in the information relating to being lost.

Steps S600 and S610 are the same as the embodiments described above.

The second terminal 20 can attempt to respond to the mobile terminal 100 (S620). For example, the attempt to respond is the attempt to transmit a response to SMS, MMS, or an e-mail received from the mobile terminal 100 or the attempt to transmit a call to the mobile terminal 100 when the second terminal 20 failed to receive a call originated from the mobile terminal 100 (absent call).

The second terminal 20, in response to the attempt to respond carried out at step S620, can communicate by specifying the received contact point as a receiver (S630). For example, the second terminal 20, if it transmits a call in response to the absent call, can transmit a call by specifying the contact point as a receiver instead of transmitting a call with the mobile terminal 100 as a receiver. At this point, when the contact point includes both of a phone number and an e-mail address, particular information can be transmitted to the e-mail address together with transmission of the call. The particular information transmitted to the e-mail address can be the information stored already in the second terminal 20 or the information transmitted from the mobile terminal 100.

Embodiments described in the document employ more than one terminal. Accordingly, embodiments described in the document can be implemented in a standard manner. For example, through standardization of the information relating to being lost transmitted from the mobile terminal 10, the second terminal 20 can manage the information relating to being lost without particular information. The mobile terminal 10 and the second terminal 20 can share an application that can manage the standardized information relating to being lost.

A mobile terminal, a communication system, and a method for managing a missing mode according to the present invention provide the following advantageous effects.

The present invention enables a user who has lost a mobile terminal to easily monitor the use of the lost mobile terminal at a remote place.

The present invention enables a user who has lost a mobile terminal to restrict functional operations of the lost mobile terminal.

The present invention enables a user who has lost a mobile terminal to easily find the lost mobile terminal.

A method of managing a missing mode of a communication system according to the present invention and a method for managing a missing mode of a mobile terminal described above can be provided being recorded in a computer-readable recording medium as a program to be executed in a computer.

A method for managing a missing mode of a communication system and a method for managing a missing mode of a mobile terminal according to the present invention can be executed by software. When executed by software, constituting means of the present invention correspond to code segments carrying out necessary tasks. Programs or code segments can be stored in a processor-readable medium or transferred by a transfer medium or computer data signals combined with carrier waves through a communication network.

A computer-readable recording medium includes all kinds of recording apparatus to which data that can be read by a computer system are stored. Examples of computer-readable recording apparatus are ROM, RAM, CD-ROM, DVD±ROM, DVD-RAM, magnetic tape, floppy disk, hard disk, and optical data storage. Also, a computer-readable recording medium can be distributed across computer apparatus connected to a network and computer-readable codes can be stored and executed in a distributed manner.

It will be apparent to those skilled in the art that various modifications and variations can be made in the embodiments of the invention without departing from the spirit or scope of the invention. Also, the embodiments of the present invention are not limited to those described in the document; all or selective combinations of the embodiments are also allowed to implement various modifications of the present invention.

What is claimed is:

1. A mobile terminal providing a function of managing a missing mode, the mobile terminal comprising:
   a communication unit;
   a memory configured to store information relating to being lost including a message indicating that the mobile terminal has been lost, a particular contact point, and a control code to designate the contact point as a receiver; and
   a controller configured to:
      receive an activation signal wirelessly from a first remote terminal through the communication unit,
      activate a missing mode of the mobile terminal in response to the received activation signal,
      perform a first communication function with a second remote terminal in response to a user input after the missing mode has been activated, wherein the first communication function corresponds to a call transmission, and the control code is transmitted to the second remote terminal immediately after the call transmission is attempted, and
      if a communication channel is established between the mobile terminal and the second remote terminal according to the second remote terminal responding, control the control code to designate the contact point as a receiver of the first communication function, and the communication unit to transmit data related to the first communication function to a third remote terminal corresponding to the designated contact point, and control the control code to suspend transmission of the data to the second remote terminal and to transmit the message to the second remote terminal.

2. The mobile terminal of claim 1, wherein the controller is further configured to prevent the information relating to being lost from being visually and audibly output from the mobile terminal.

3. The mobile terminal of claim 1, wherein the message is at least one of a text message, an audio message, and an image.

4. The mobile terminal of claim 1, wherein the message and the contact point are only remotely editable by the first remote terminal while the mobile terminal is in the missing mode.

5. The mobile terminal of claim 1, wherein the first communication function further includes a function of transmitting a message, the message including one of an instant message, an short message service (SMS) message, an multimedia messaging system (MMS) message, an e-mail, and a data communication including at least one of text, audio, a still image, and a moving image.

6. The mobile terminal of claim 1, wherein the controller is further configured to control the message to be output in or by the second remote terminal.

7. The mobile terminal of claim 6, wherein the control code specifies a particular field of data used to transmit the data to be replaced with the message.

8. The mobile terminal of claim 1, wherein the first remote terminal comprises at least one of a mobile phone and a personal computer.

9. The mobile terminal of claim 1, wherein the controller is configured to prevent access via an input unit of the mobile terminal to the information relating to being lost while the mobile terminal is in the missing mode.

10. The mobile terminal of claim 1, wherein the controller is configured to:
control the memory to record a use history of the mobile terminal in a state the mobile terminal is in the missing mode in a form of a log file, and
control the communication unit to transmit the log file to an e-mail address corresponding to the particular contact point.

11. The mobile terminal of claim 10, wherein the log file is transmitted to the e-mail address each time a particular function of the mobile terminal is performed.

12. The mobile terminal of claim 11, wherein the particular function includes a pay function.

13. A method for managing a missing mode of a mobile terminal, the method comprising:
wirelessly receiving an activation signal from a first remote terminal;
receiving an activation signal wirelessly from the first remote terminal through a communication unit;
storing information relating to being lost including a message including that the mobile terminal has been lost, a particular contact point, and a control code to designate the contact point as a receiver;
activating a missing mode of the mobile terminal in response to the received activation signal;
performing a first communication function with a second remote terminal in response to a user input after the missing mode has been activated, wherein the first communication function corresponds to a call transmission, and the control code is transmitted to the second remote terminal immediately after the call transmission is attempted;
if a communication channel is established between the mobile terminal and the second remote terminal according to the second remote terminal responding, controlling the control code to designate the contact point as a receiver of the first communication function, and the communication unit to transmit data related to the first communication function to a third remote terminal corresponding to the designated contact point; and controlling the control code to suspend transmission of the data to the second remote terminal and to transmit the message to the second remote terminal.

14. The method of claim 13, wherein the message is one of a text message, an audio message, and an image.

15. The method of claim 13, further comprising: editing the message and the contact point in response to an edit command received from the first remote terminal while the mobile terminal is in the missing mode.

16. The method of claim 13, wherein the first communication function further includes a function of transmitting a message, the message including: one of an instant message, an short message service (SMS) message, an multimedia messaging system (MMS) message, and an e-mail.

17. The method of claim 13, wherein the information relating to being lost includes the control code specifying that the message is to be output in or by the second remote terminal.

18. The method of claim 13, wherein the first remote terminal comprises at least one of a mobile phone and a personal computer.

* * * * *